(12) United States Patent
Knowles et al.

(10) Patent No.: US 11,298,897 B2
(45) Date of Patent: Apr. 12, 2022

(54) COMPOSITE STRUCTURE HAVING THERMOPLASTIC RADIUS FILLER

(71) Applicant: The Boeing Company, Chicago, IL (US)

(72) Inventors: Devin Knowles, Kenmore, WA (US); Stanley Stawski, Camano Island, WA (US)

(73) Assignee: The Boeing Company

( * ) Notice: Subject to any disclaimer, the term of this patent is extended or adjusted under 35 U.S.C. 154(b) by 217 days.

(21) Appl. No.: 16/521,544

(22) Filed: Jul. 24, 2019

(65) Prior Publication Data
US 2021/0023801 A1 Jan. 28, 2021

(51) Int. Cl.
*B29C 70/74* (2006.01)
*B29K 101/12* (2006.01)

(52) U.S. Cl.
CPC ........ *B29C 70/745* (2013.01); *B29K 2101/12* (2013.01)

(58) Field of Classification Search
CPC . B29C 70/745; B29C 70/342; C29K 2101/12; B29L 2031/3082
See application file for complete search history.

(56) References Cited

U.S. PATENT DOCUMENTS

| | | | | |
|---|---|---|---|---|
| 5,057,000 A * | 10/1991 | Mangone, Jr. | ........ | B29C 45/374 425/190 |
| 5,318,418 A * | 6/1994 | Netto | .................... | B29C 45/374 249/103 |
| 5,894,005 A * | 4/1999 | Steel | ...................... | B22D 46/00 264/40.1 |
| 7,252,136 B2 * | 8/2007 | Rieke | ...................... | B22C 23/00 164/229 |
| 2014/0374013 A1 * | 12/2014 | Hansen | ................... | B29C 70/30 156/243 |

(Continued)

FOREIGN PATENT DOCUMENTS

| DE | 102006031432 | | 1/2008 | |
|---|---|---|---|---|
| DE | 102006031432 A1 * | | 1/2008 | ................ C08J 5/04 |

(Continued)

OTHER PUBLICATIONS

DE-102006031432-A1 Machine Translation (2006).*

(Continued)

*Primary Examiner* — Travis M Figg

(57) ABSTRACT

A method of manufacturing a cured composite structure includes inserting a plurality of radius filler segments into a radius cavity extending along a length of an uncured composite base member to form an uncured structural assembly. The plurality of radius filler segments are placed in end-to-end arrangement within the radius cavity and each having opposing segment ends and being formed of a thermoplastic material. The method additionally includes heating the structural assembly at least to a base member cure temperature that causes the segment ends of end-to-end pairs of the plurality of radius filler segments to fuse together and form a continuous radius filler element that extends along the length of the composite base member. The method also includes allowing the structural assembly to cure to form a cured composite structure.

20 Claims, 15 Drawing Sheets

(56) References Cited

U.S. PATENT DOCUMENTS

| | | | | |
|---|---|---|---|---|
| 2015/0231848 A1* | 8/2015 | Chapman | ................ | B29C 53/04 |
| | | | | 428/174 |
| 2015/0360396 A1* | 12/2015 | Thomas | ................... | B64C 1/12 |
| | | | | 428/221 |
| 2016/0009045 A1* | 1/2016 | Thomas | ................ | B29C 66/721 |
| | | | | 428/137 |
| 2019/0176414 A1* | 6/2019 | Kendall | ................ | B29C 70/745 |

FOREIGN PATENT DOCUMENTS

| | | |
|---|---|---|
| EP | 2974814 | 1/2016 |
| EP | 3446864 | 2/2019 |

OTHER PUBLICATIONS

EPO, Europoean Search Report for Appl. No. 20182980.1, dated Dec. 4, 2020.
EPO, Extended Europoean Search Report, Appl. No. 20182980.1, dated Mar. 19, 2021.
Designer Data, PEI data sheet, dated Aug. 14, 2020.
WebMat, "Overview of materials for Epoxy/Carbon Fiber Composit," dated Jul. 8, 2019.
U.S. Appl. No. 16/521,550, filed Jul. 24, 2019 entitled Radius Filler for Wet Composite Layup.
U.S. Appl. No. 16/521,557, filed Jul. 24, 2019 entitled Permeable Radius Filler for Composite Structure.

* cited by examiner

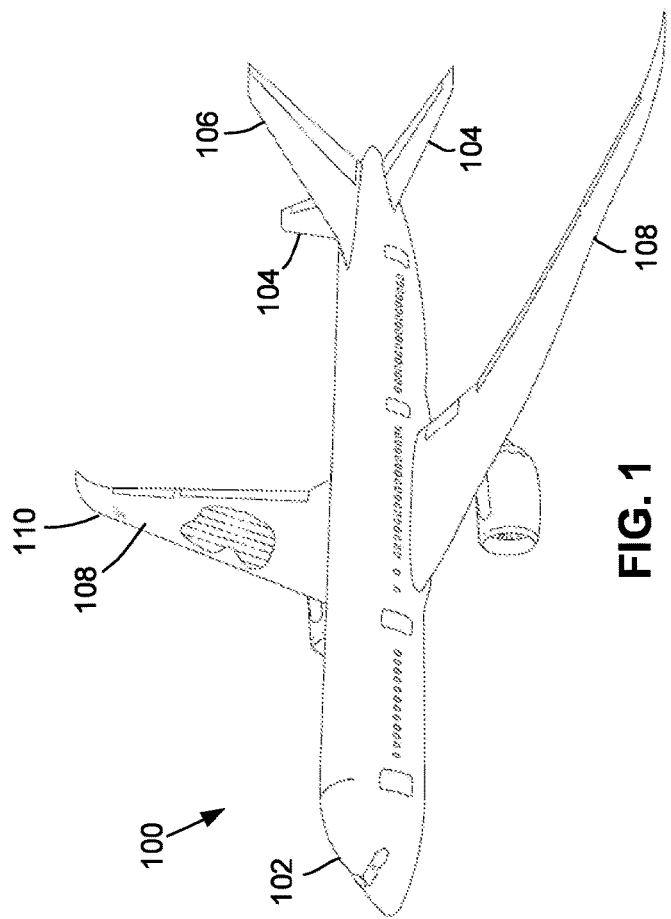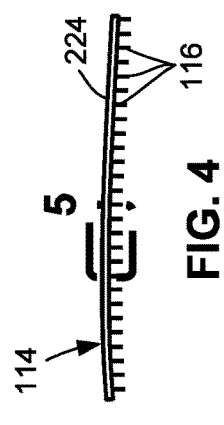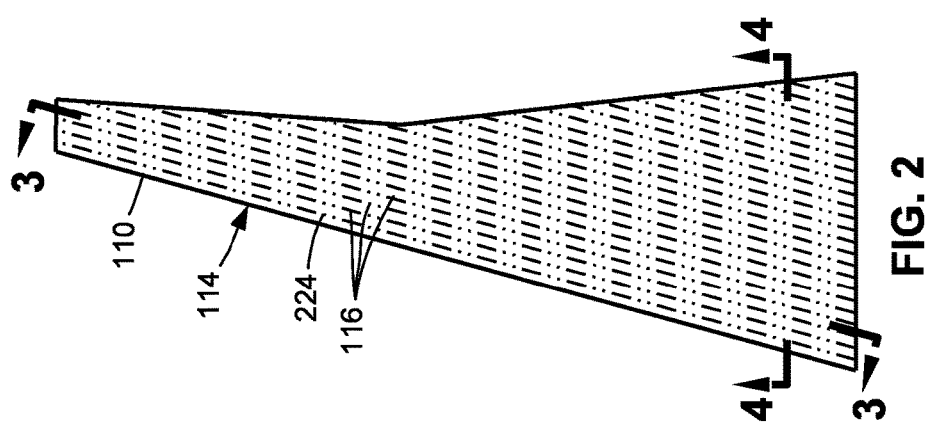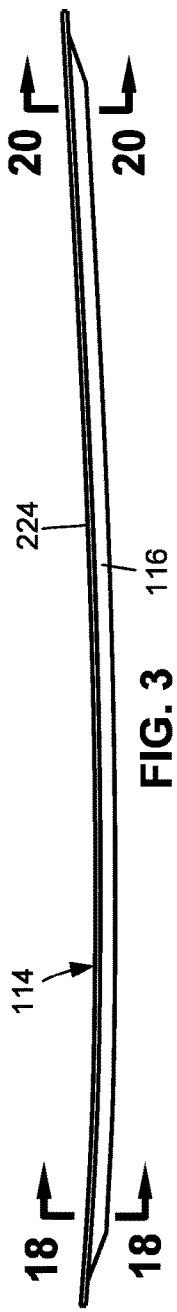

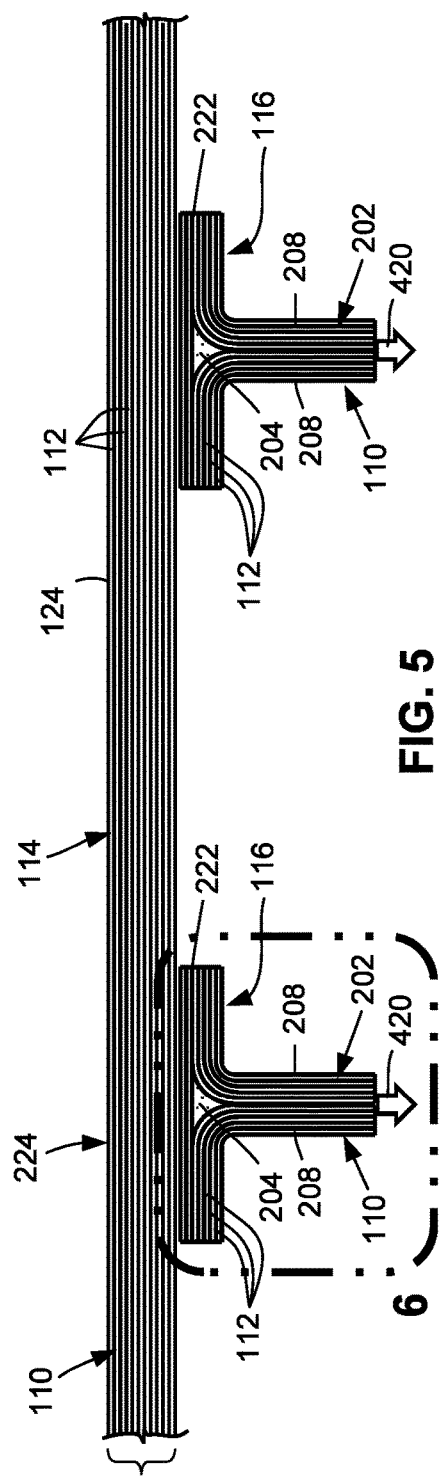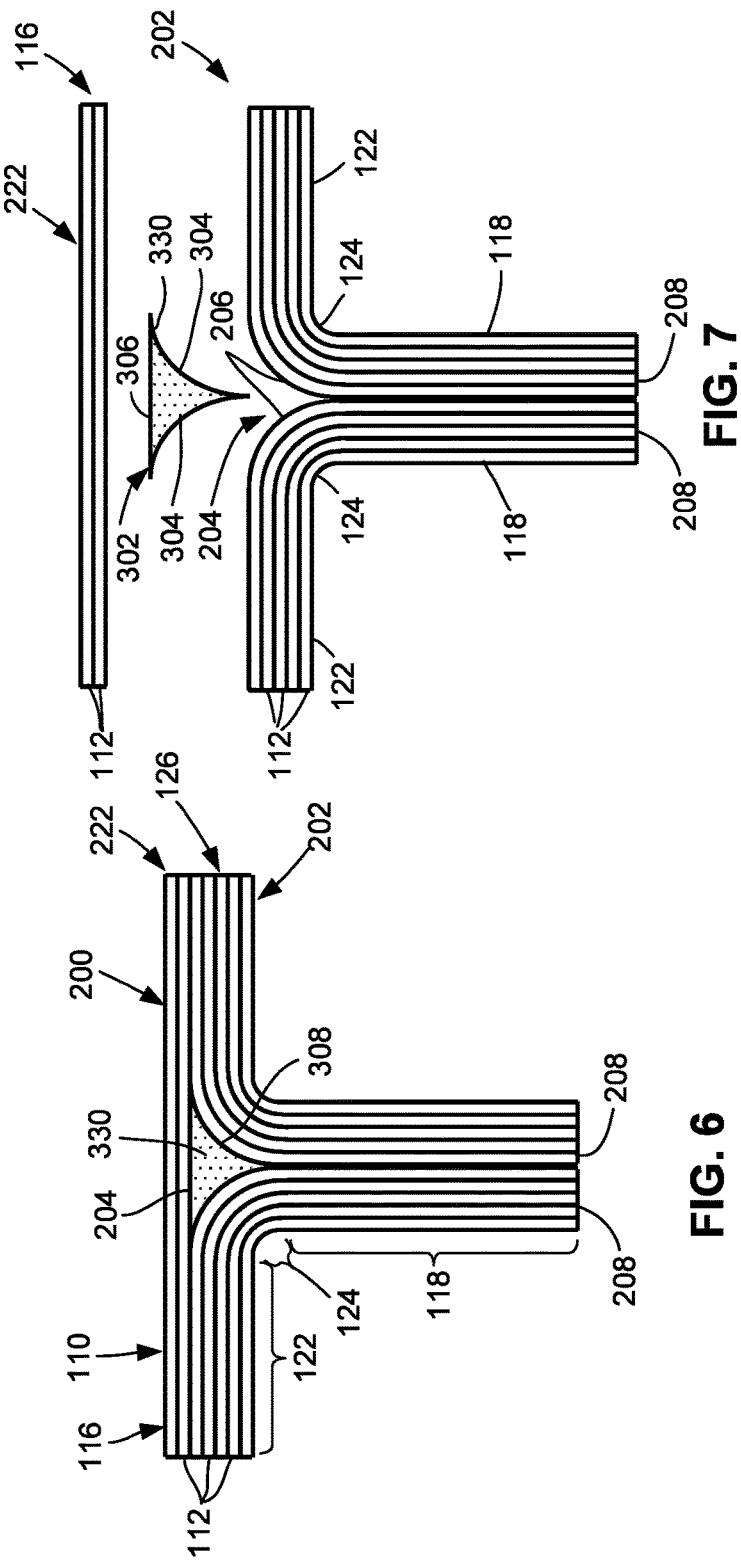

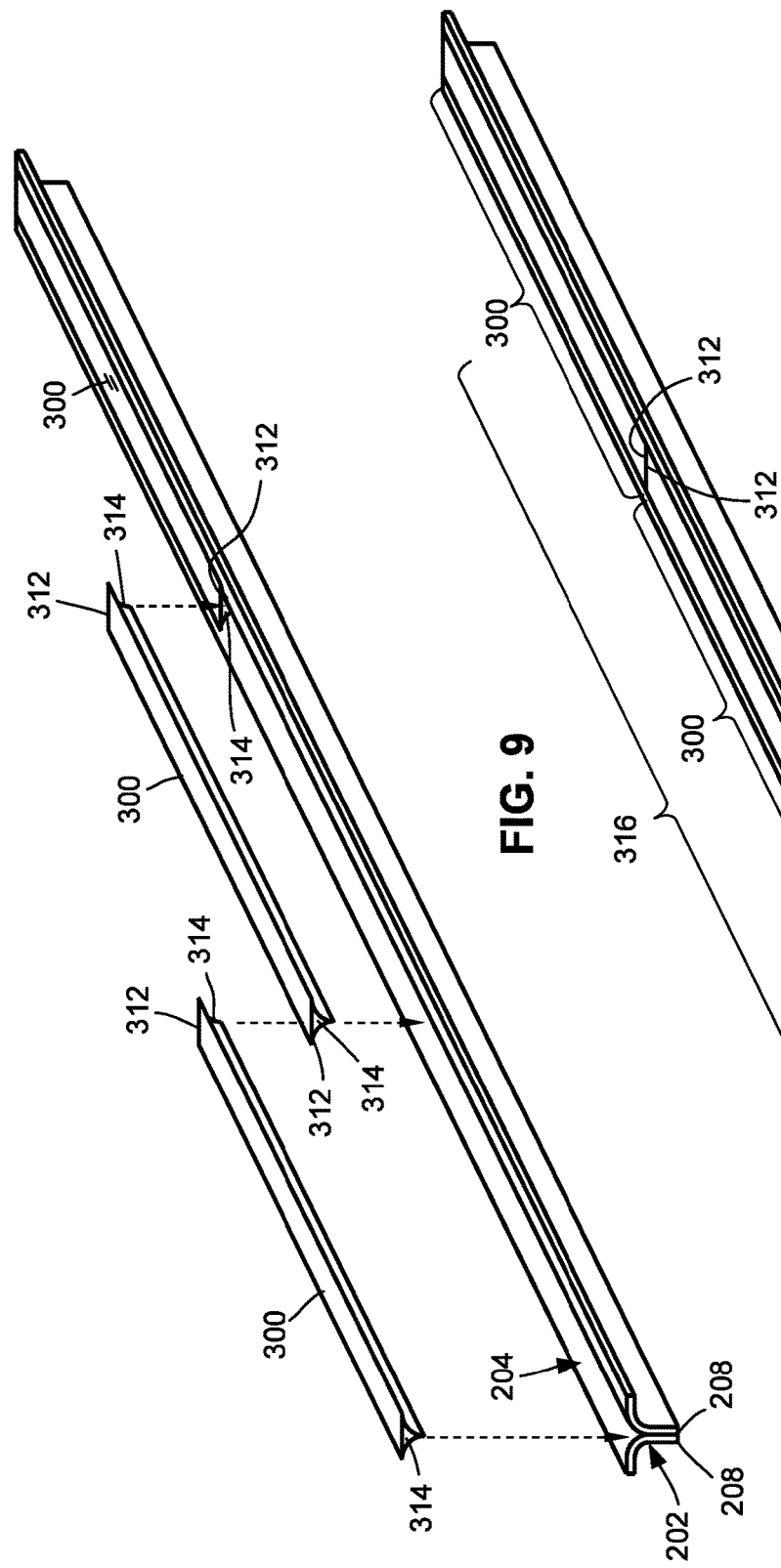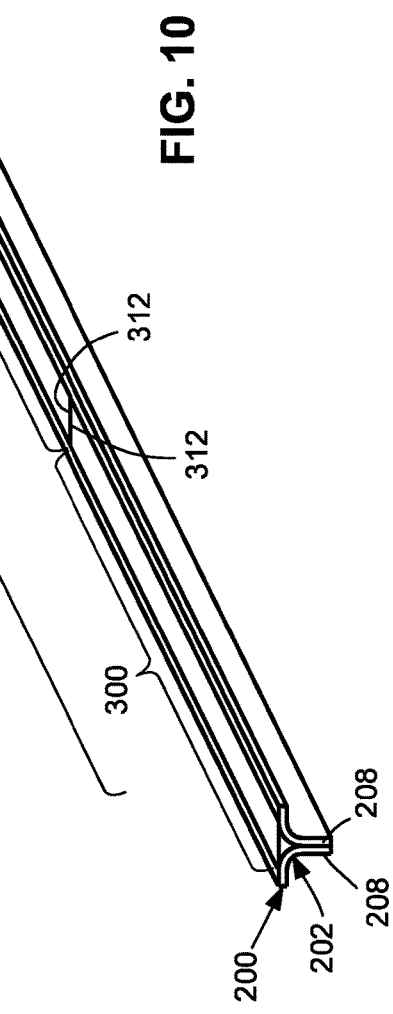

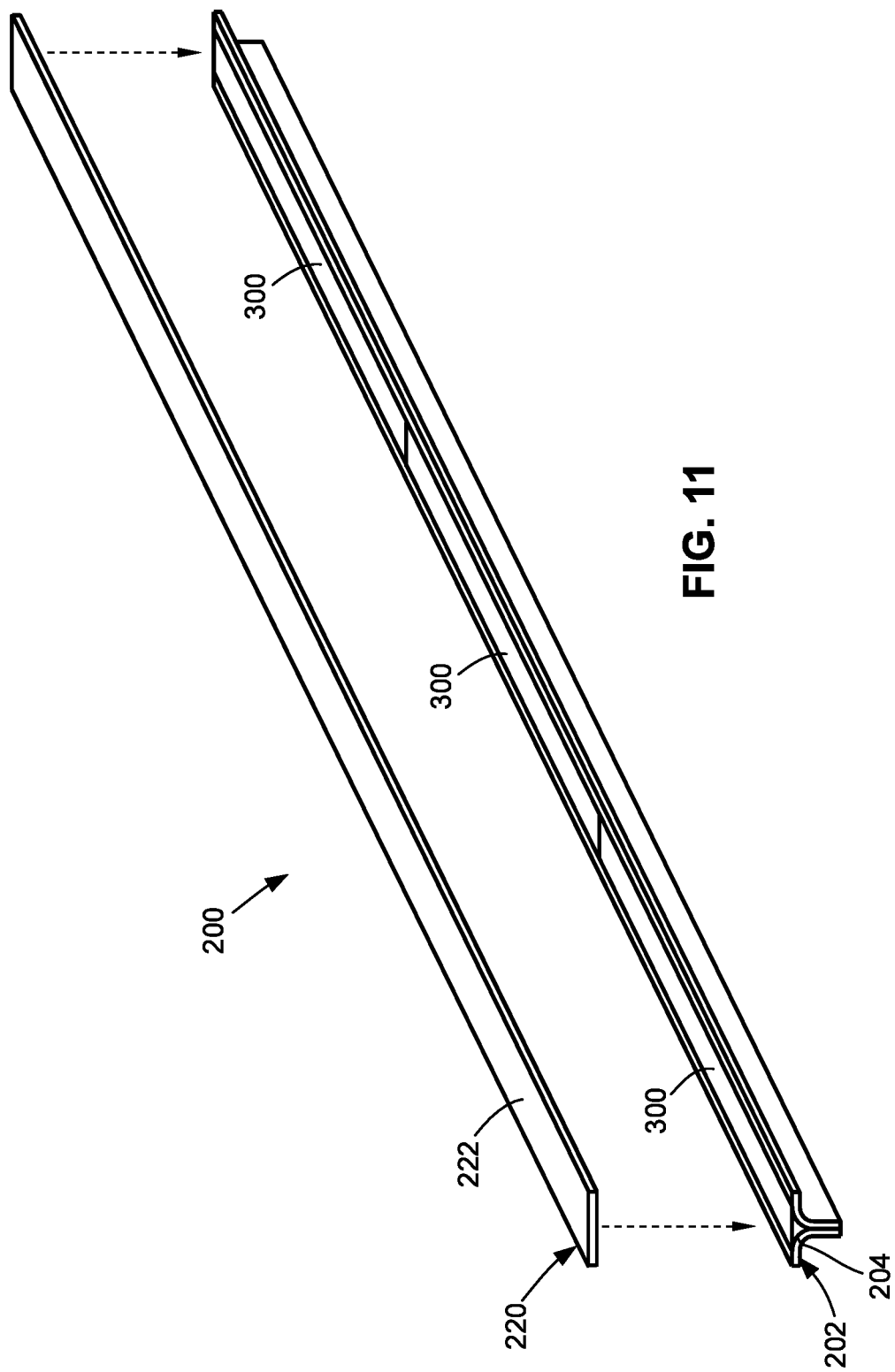

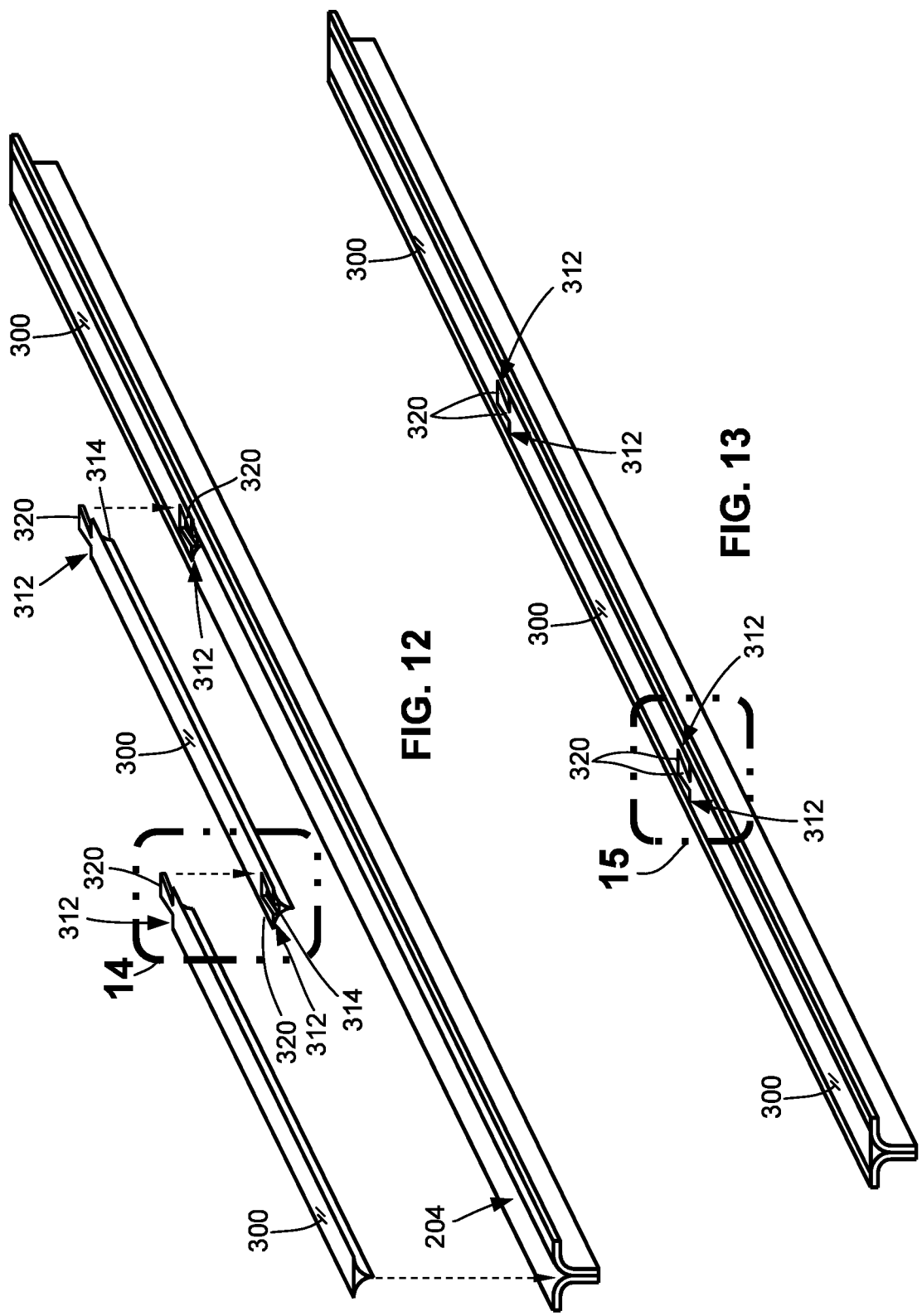

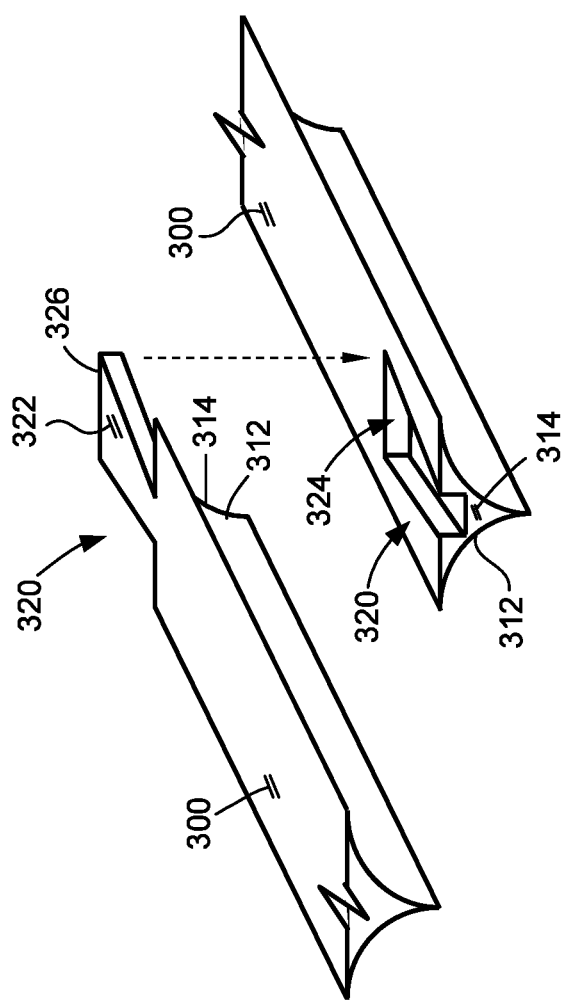
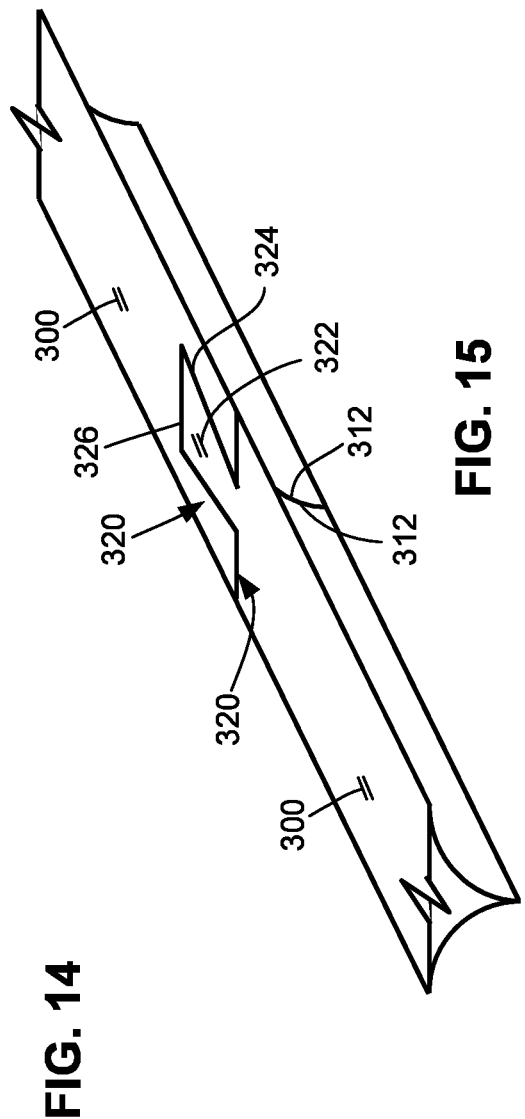
FIG. 14
FIG. 15

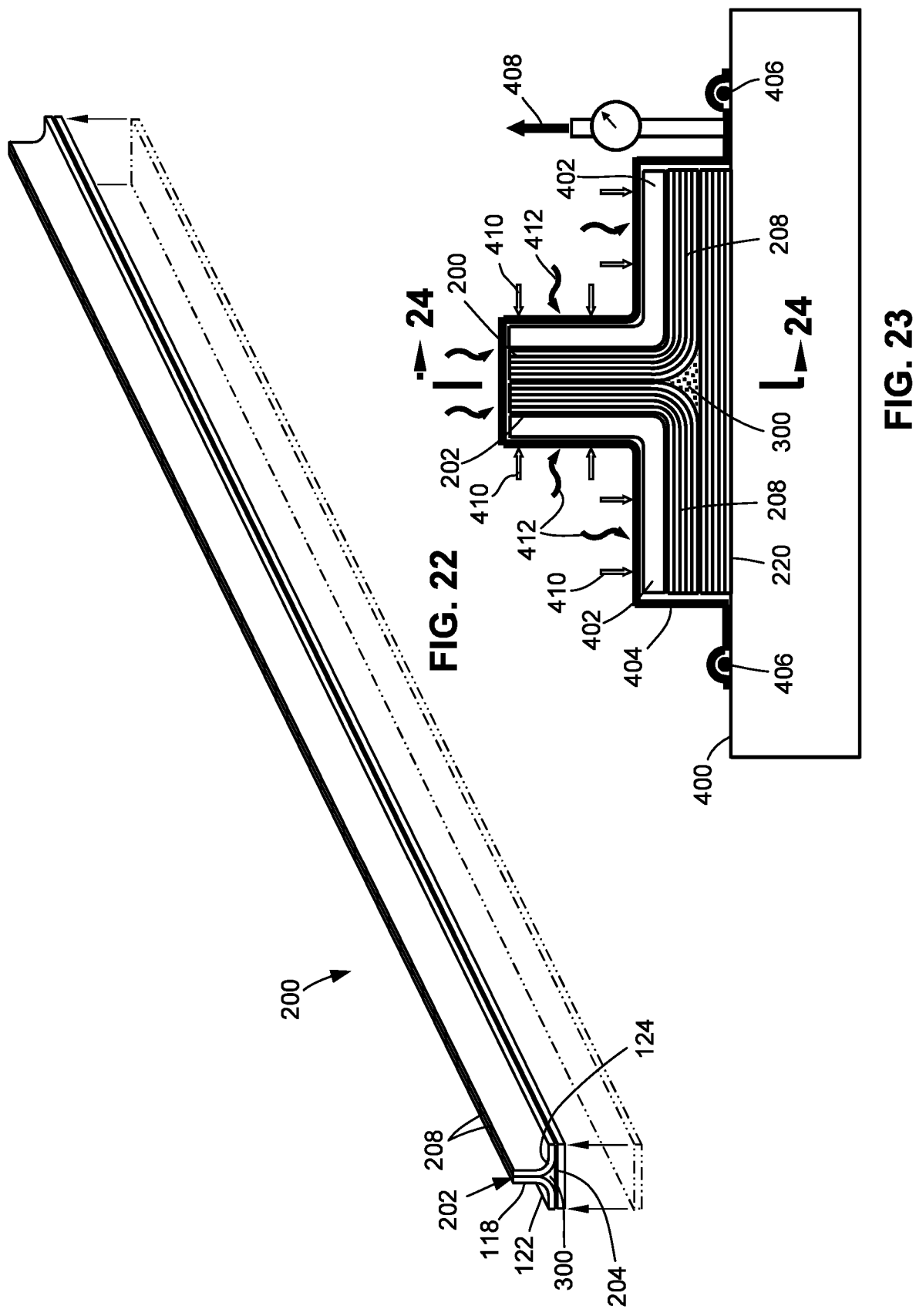

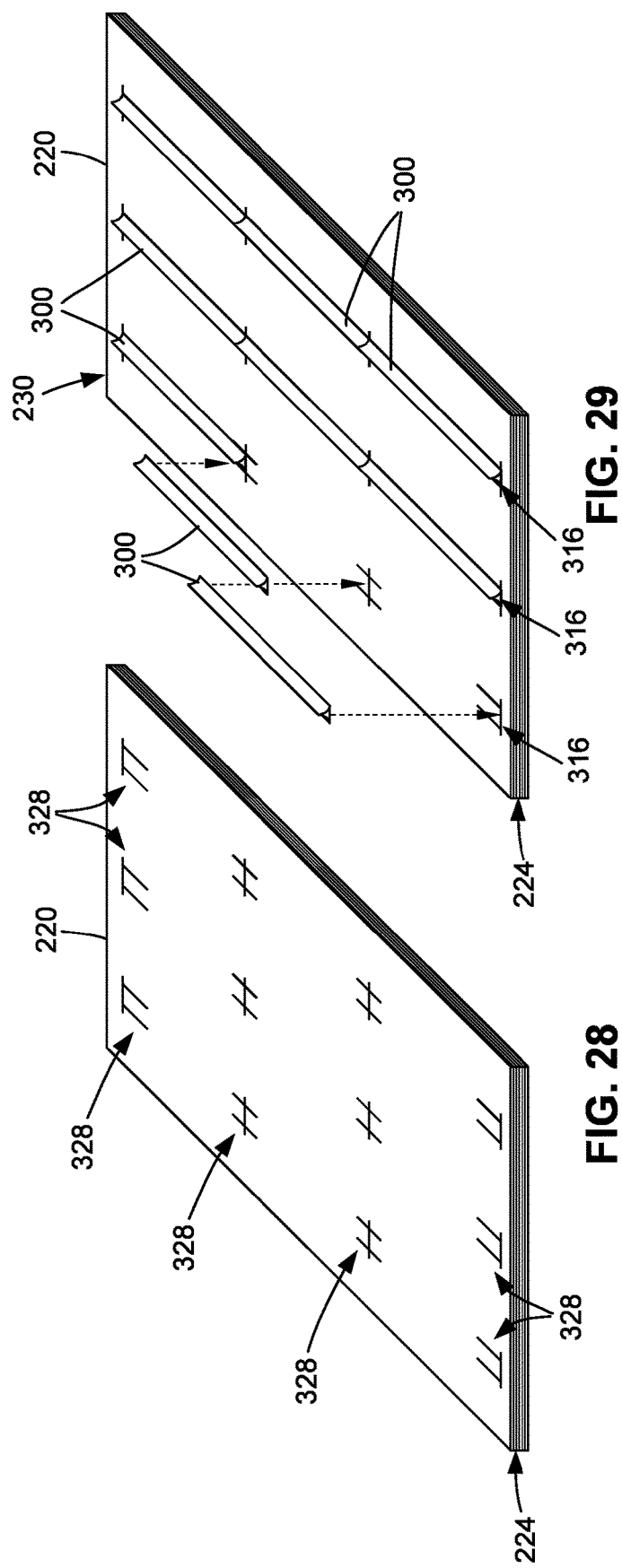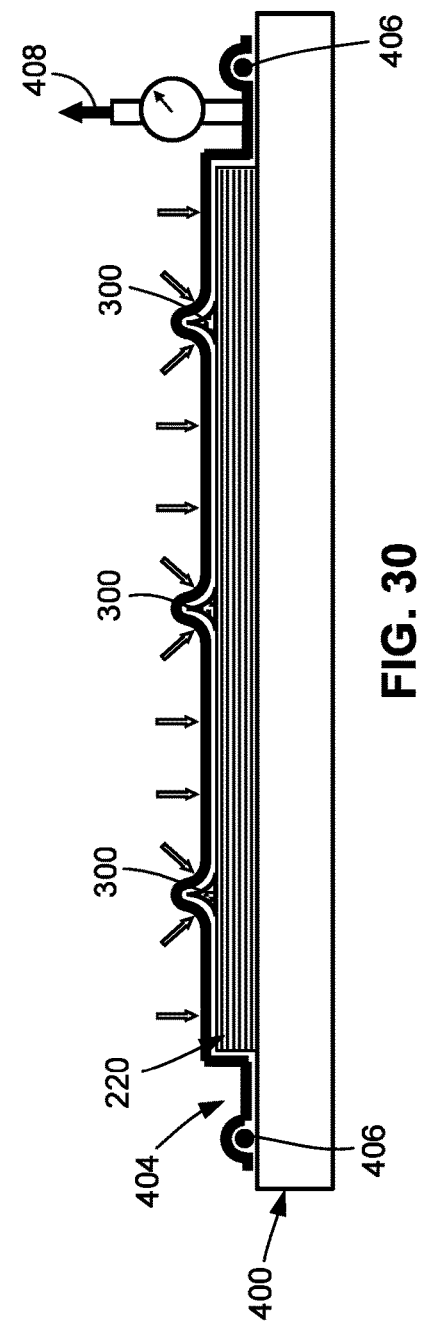

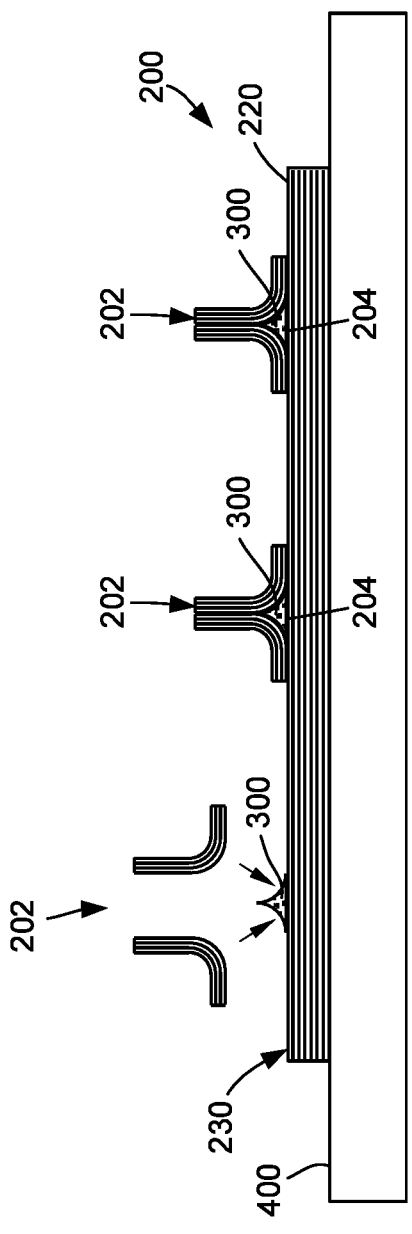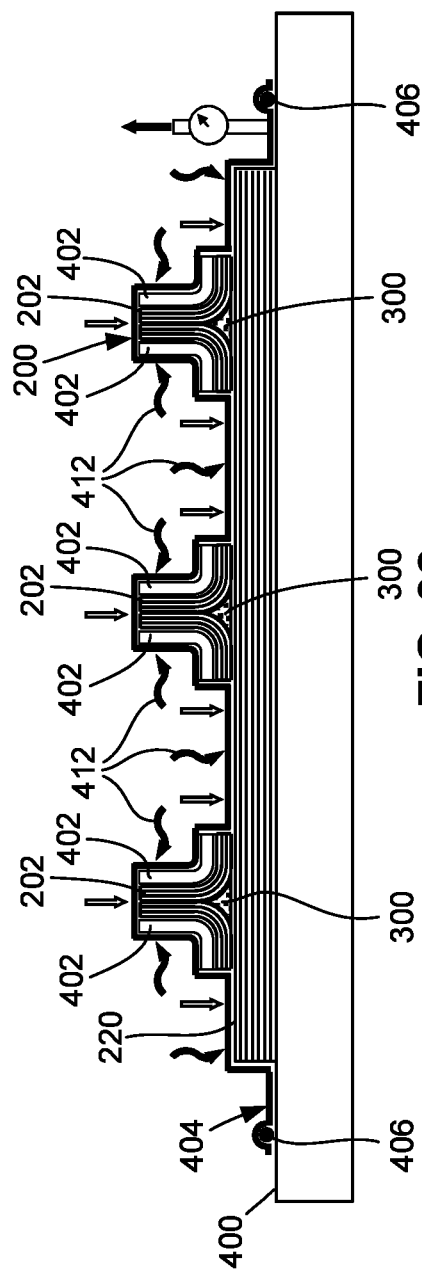

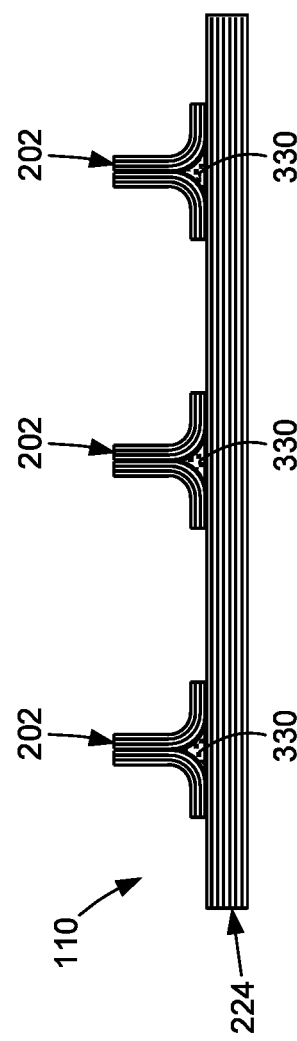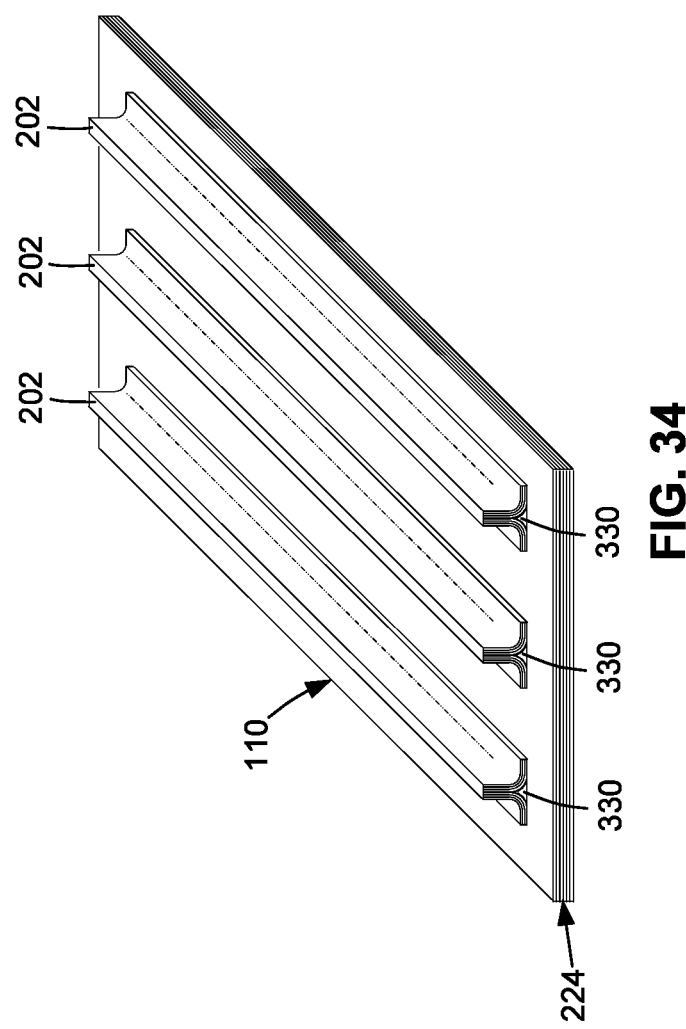

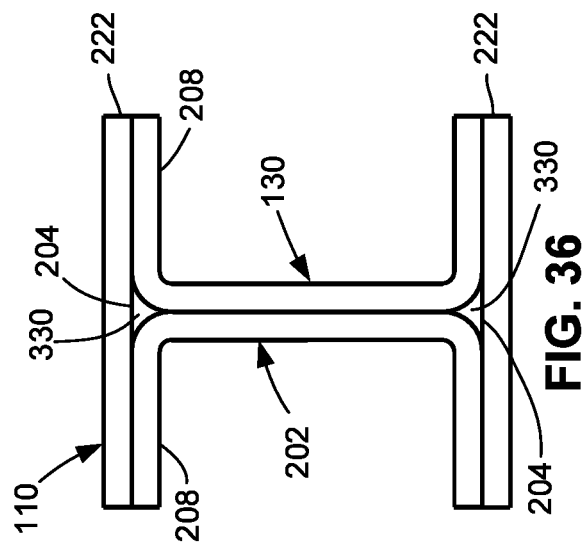
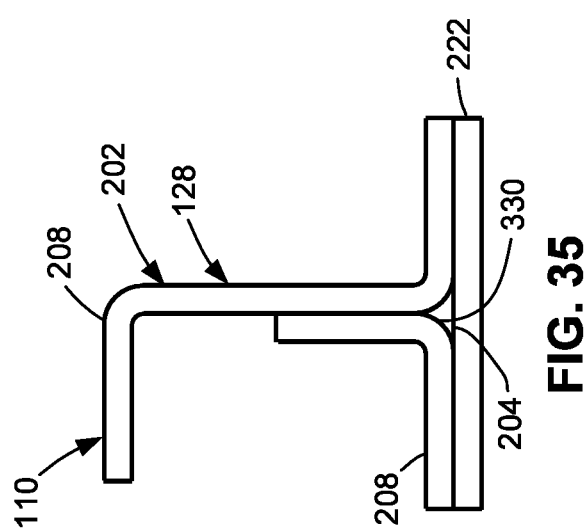
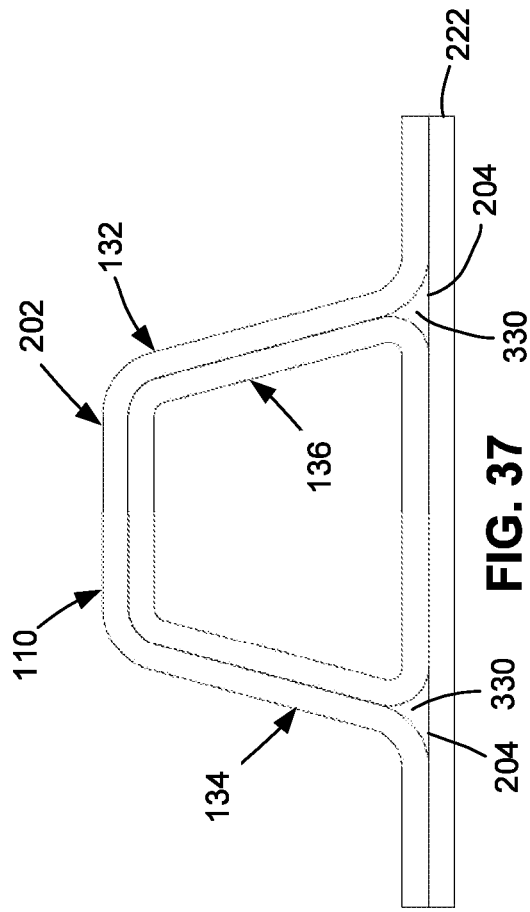

COMPOSITE STRUCTURE HAVING THERMOPLASTIC RADIUS FILLER

FIELD

The present disclosure relates generally to composites manufacturing and, more particularly, to a composite structure having a thermoplastic radius filler and a method of manufacturing the composite structure.

BACKGROUND

Composite structures are used in a wide variety of applications due to their high strength-to-weight ratio, corrosion resistance, and other favorable properties. In aircraft construction, composites are used in increasing quantities to form the fuselage, wings, and other components. For example, the wings of an aircraft may include composite skin panels reinforced by composite stringers.

Composite stringers may be provided in a variety of cross-sectional shapes. For example, a composite stringer of a wing panel may have a T-shaped cross-section formed by assembling a pair of composite channels (e.g., L-shaped channels) in back-to-back arrangement. Each composite channel includes a flange portion and a web portion joined at a radiused web-flange transition. The web portions of the composite channels are assembled in back-to-back arrangement to form a composite base member, and which results in a lengthwise notch in the composite base member defined by the web-flange transitions of the back-to-back composite channels. The lengthwise notch may be referred to as a radius cavity of the composite stringer. To improve the strength, stiffness, and durability of a composite structure having composite stringers, it is necessary to fill each radius cavity with a radius filler.

Conventional methods of manufacturing and installing radius fillers present several challenges. For example, one method involves laying up individual strips of prepreg composite material (e.g., unidirectional reinforcing fibers pre-impregnated with resin) into the radius cavity of a composite base member. Each strip of prepreg composite material may be cut to a precise width prior to installation as an individual composite ply into the radius cavity. The ply-by-ply installation of individual strips of prepreg composite material is labor-intensive and time-consuming.

Another method of manufacturing radius fillers involves pre-fabricating each radius filler to match the shape of the radius cavity to be filled. Individual strips of prepreg composite material are laid up in stacked formation to form a radius filler on a layup tool prior to installation of the radius filler in the radius cavity. For a radius filler having unidirectional reinforcing fibers, the axial stiffness of the radius filler and the composite base member may be mismatched. For example, the lengthwise orientation of the unidirectional reinforcing fibers in the radius filler results in a high axial stiffness of the radius filler relative to the axial stiffness of the composite base member. The mismatch in axial stiffness between the radius filler and the composite base member may result in undesirable strength characteristics in the cured composite structure. The effects of relatively high axial stiffness of a radius filler may be pronounced at the terminal ends of a composite stringer where reduced axial stiffness is desired.

One approach for reducing the mismatch in axial stiffness of a radius filler relative to a composite base member is to manufacture the radius filler using a laminating machine configured to laminate prepreg composite plies having non-zero degree fiber orientations (e.g., +/−30 degrees) in addition to laminating composite plies having a zero-degree fiber orientation. The ability to lay up individual composite plies with non-zero fiber orientations provides a means for more closely matching the axial stiffness of the radius filler with the axial stiffness of the composite base member. In addition, the composite plies may be laid up such that the axial stiffness of the radius filler is reduced at the terminal ends of the composite stringer. While the above-described manufacturing method is structurally advantageous, laminating machines represent a significant capital expense for construction, operation, and maintenance.

As can be seen, there exists a need in the art for a system and method of manufacturing a composite structure having a radius filler that avoids the above-noted challenges.

SUMMARY

The above-noted needs associated with radius fillers are specifically addressed and alleviated by the present disclosure which provides a method of manufacturing a cured composite structure. The method includes inserting a plurality of radius filler segments into a radius cavity extending along a length of an uncured composite base member to form an uncured structural assembly. The plurality of radius filler segments are placed in end-to-end arrangement within the radius cavity and each radius filler segment has opposing segment ends and is formed of a thermoplastic material. The method also includes heating the structural assembly at least to a base member cure temperature that causes the segment ends of end-to-end pairs of the radius filler segments to fuse together and form a continuous radius filler element that extends along the length of the composite base member. The method additionally includes allowing the structural assembly to cure to form a cured composite structure.

Also disclosed is an uncured structural assembly having a composite base member and a plurality of radius filler segments. The composite base member has a base member cure temperature and a radius cavity extending along a length of the composite base member. The plurality of radius filler segments are configured to be inserted into the radius cavity in end-to-end arrangement. The plurality of radius filler segments each have opposing segment ends and are homogenous and are formed of a thermoplastic material. The thermoplastic material has a temperature at which the segment ends of end-to-end pairs of the plurality of radius filler segments fuse together. The base member cure temperature is at least as high as the temperature at which the segment ends of the radius filler segments fuse together.

Also disclosed is a cured composite structure having a composite base member and a radius filler element. The composite base member has a radius cavity extending along a length of the composite base member. The radius filler element is contained in the radius cavity and extends continuously along a length of the radius cavity. The radius filler element is homogenous and is formed of a thermoplastic material having at least one of the following two properties: (1) the radius filler element has a Young's modulus that is less than the Young's modulus of the composite base member, and/or (2) the radius filler element has a percent elongation at failure that is greater than the percent elongation at failure of the composite base member.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;

FIG. 2 is a top-down view of an example of a cured composite structure configured as a wing panel of an aircraft, the wing panel having a composite skin panel and a plurality of composite stringers;

FIG. 3 is a sectional view of the wing panel taken along line 3-3 of FIG. 2 and illustrating a composite stringer coupled to the composite skin panel;

FIG. 4 is a sectional view of the wing panel taken along line 4-4 of FIG. 2 and illustrating a plurality of composite stringers coupled to the composite skin panel;

FIG. 5 is a magnified view of the portion of the wing panel identified by reference numeral 5 in FIG. 4 and illustrating a continuous radius filler element formed of thermoplastic material and filling the radius cavity of each composite stringer;

FIG. 6 is a magnified view of one of the composite stringers showing the continuous radius filler element contained within the radius cavity which is defined by the composite base member and a composite strip;

FIG. 7 is an exploded view of the composite stringer of FIG. 6;

FIG. 9 is a partially exploded perspective view of an example of an uncured composite base member and a plurality of radius filler segments formed of thermoplastic material and configured to be inserted into the radius cavity of the uncured composite base member to form a structural assembly in which the radius filler segments are in end-to-end arrangement within the radius cavity;

FIG. 10 is a perspective view of the structural assembly of FIG. 9 showing the radius filler segments in end-to end arrangement to form a segment series within the radius cavity of the uncured composite base member;

FIG. 11 is a partially exploded perspective view of the structural assembly and illustrating an uncured composite strip positionable over the uncured composite base member for capturing the radius filler segments within the radius cavity;

FIG. 12 is a partially exploded perspective view of a further example of a plurality of radius filler segments each having interlocking features for interlocking the segments ends of the radius filler segments within the radius cavity of the uncured composite base member;

FIG. 13 is a perspective view of the structural assembly of FIG. 12 showing the interlocking features coupling the radius filler segments in end-to-end arrangement;

FIG. 14 is an exploded view of an example of two radius filler segments having interlocking features configured in a dovetail configuration for interlocking the segment ends of the radius filler segments;

FIG. 15 is an assembled view of the radius filler segments of FIG. 14;

FIG. 22 is a perspective view of an example of the structural assembly of FIG. 13 rotated 180 degree such that the composite panel is on a bottom side of the structural assembly;

FIG. 23 is a sectional view of an example of the structural assembly of FIG. 22 vacuum bagged to a cure tool and illustrating the application of heat and pressure for curing the structural assembly;

FIG. 28 is a perspective view of an example of an uncured composite skin panel having a plurality of location markings identifying the location of each radius filler segment on the composite skin panel for assembling an panel subassembly;

FIG. 29 is a perspective view of the panel subassembly during placement of the radius filler segments in alignment with the location markings;

FIG. 30 is a sectional view of the panel subassembly of FIG. 28 vacuum bagged to a cure tool and illustrating the application of pressure for at least partially adhering the radius filler segments to the surface of the composite skin panel;

FIG. 31 is a sectional view of the panel subassembly of FIG. 30 after removal of the vacuum bag and illustrating a plurality of composite base members assembled to the panel subassembly such that the radius filler segments are received into the radius filler cavities of the plurality of composite base members to form a structural assembly;

FIG. 32 is a sectional view of the structural assembly of FIG. 31 vacuum bagged to the cure tool and illustrating the application of heat and pressure for curing the structural assembly;

FIG. 33 is a sectional view of a cured composite article resulting from the curing of the structural assembly of FIG. 32;

FIG. 34 is a perspective view of the cured composite article of FIG. 33;

FIG. 35 is a sectional view of an example of a cured composite structure containing a continuous radius filler element and configured in a J-shaped cross-section;

FIG. 36 is a sectional view of an example of a cured composite structure containing a continuous radius filler element and configured in an I-shaped cross-section;

FIG. 37 is a sectional view of an example of a cured composite structure containing a continuous radius filler element and configured in a hat-shaped cross-section.

DETAILED DESCRIPTION

Figure 8:
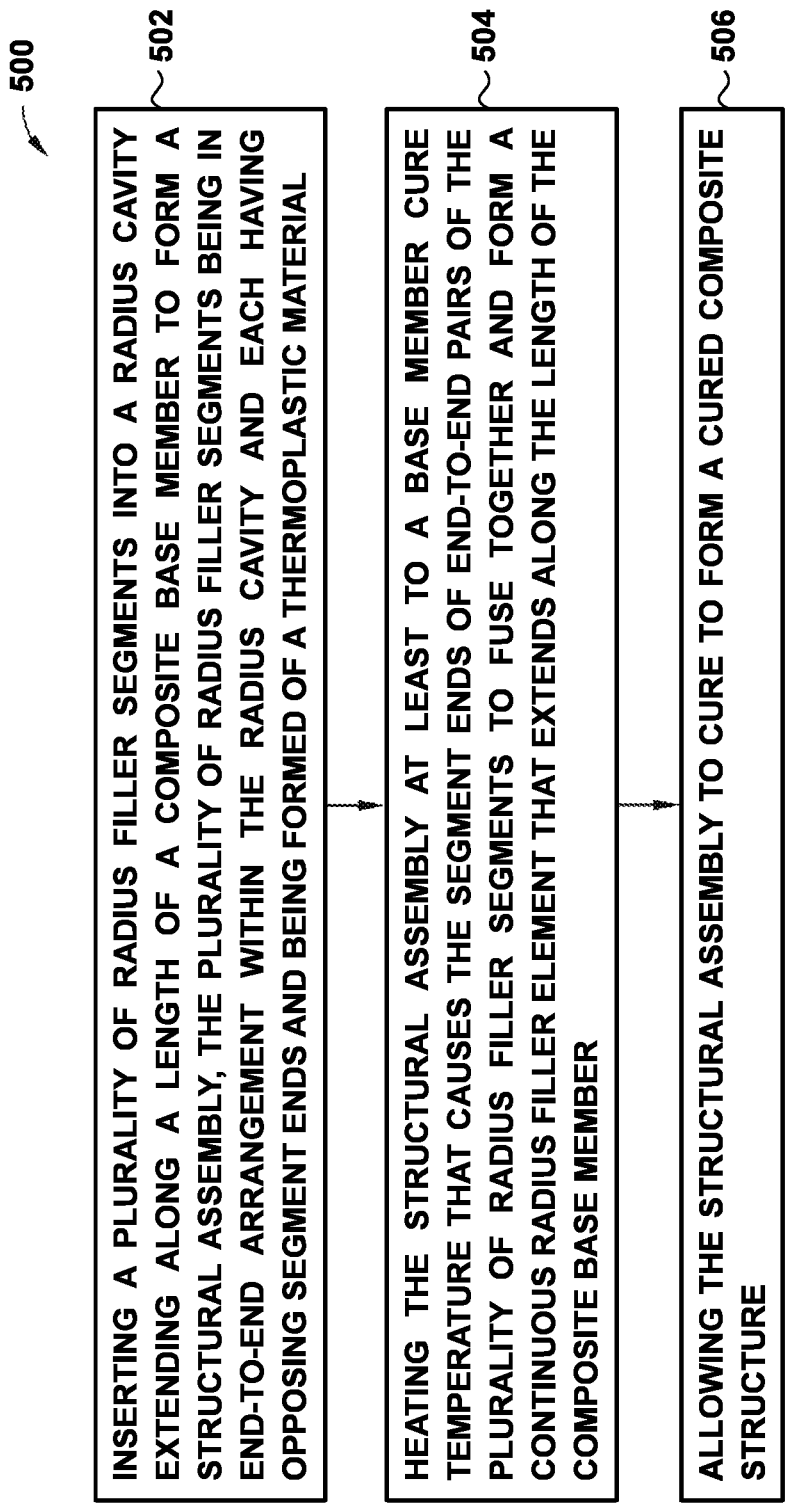
FIG. 8 is a flowchart of operations included in a method of manufacturing a cured composite structure.

Referring now to the drawings which illustrate preferred and various embodiments of the disclosure, shown in FIG. 1 is a perspective view of an aircraft 100 which may include one or more cured composite structures 110, one or more of which may have a continuous radius filler element 330 (FIG. 6) formed of thermoplastic material and manufactured as described below. The aircraft 100 may include a fuselage 102, a horizontal tail 104, a vertical tail 106, and a pair of wings 108, any one or more of which may represent cured composite structures 110. For example, FIG. 2 shows a cured composite structure 110 configured as wing panel 114 having a composite skin panel 224 and a plurality of composite stringers 116, each of which may include a continuous radius filler element 330. FIG. 3 is a spanwise sectional view of the wing panel 114 showing a composite stringer 116 coupled to the composite skin panel 224. FIG. 4 is a chordwise sectional view of the wing panel 114 showing the plurality of composite stringers 116 coupled to the composite skin panel 224.

FIG. 5 is a magnified view of a portion of the wing panel 114 showing the composite stringers 116 coupled to the composite skin panel 224. The composite skin panel 224 is formed of composite plies 112 which may be separately laid up on a wing skin layup tool (not shown). Each one of the stringers comprises a composite base member 202 which, in the example shown, is made up of back-to-back composite channels 208 each having an L-shaped configuration. Each one of the composite channels 208 is formed of composite plies 112 which may be laid up on a base member layup tool (not shown) and assembled in back-to back relationship to form a composite base member 202. A plurality of radius filler segments 300 (e.g., FIG. 9) are inserted into the radius cavity 204, and a composite strip 222 (e.g., FIG. 11) may optionally be assembled over the composite base member 202 to encapsulate the radius filler segments 300 within the radius cavity 204, thereby forming a structural assembly 200 that may be heated and/or cured (e.g., FIG. 23) to form a cured composite structure 110 (e.g., a composite stringer). Alternatively, one or more structural assemblies 200 (e.g., cured or uncured) may be assembled to a composite skin panel 224 (e.g., cured or uncured) and co-bonded or co-cured to form a cured composite structure 110, such as the wing panel 114 shown in FIG. 2.

FIG. 6 is a magnified view of an example of a composite stringer 116 showing a continuous radius filler element 330 contained within the radius cavity 204 of the composite base member 202. FIG. 7 is an exploded view of the composite stringer 116. As described in greater detail below, the continuous radius filler element 330 is comprised of a plurality of radius filler segments 300 (e.g., FIGS. 9-10) installed in a radius cavity 204 of a composite base member 202 (e.g., FIGS. 9-10) to form a structural assembly 200 The radius filler elements 330 are arranged in end-to-end relationship with each other to form a segment series 316 (FIG. 10) within the radius cavity 204. The structural assembly 200 is heated, causing the segment ends 312 (e.g., FIG. 9) of the radius filler segments 300 to fuse together and form a continuous radius filler element 330. In some examples, the heating of the structural assembly 200 may occur during curing of the composite base member 202 (e.g., FIG. 23).

An uncured structural assembly 200 as disclosed herein includes examples where the composite base member 202 and/or a composite panel 220 (e.g., FIG. 11 showing composite strip 222, or FIG. 28 showing composite skin panel 224) is cured prior to installation of the radius filler segments 300 into the radius cavity 204 for fusing together during the application of heat 412 (FIG. 23) to the structural assembly 200. In such examples, the uncured structural assembly 200 may be described as uncured in the sense that as a result of heating, the radius filler segments 300 are fused together to form a continuous radius filler element 330. In this same regard, the cured composite structure 110 as disclosed herein may be described as cured in the sense that the radius filler segments 300 are fused together to form a continuous radius filler element 330.

As shown in FIGS. 6-7, the composite base member 202 has a generally V-shaped notch described as a radius cavity 204 extending along the length of the composite base member 202. The composite base member 202 is comprised of laminated composite plies 112 formed of fiber-reinforced polymer matrix material. The composite plies 112 are prepreg composite plies each comprised of reinforcing fibers pre-impregnated with resin (e.g., polymer matrix material).

The resin of the composite base member 202 may be a thermosetting resin or a thermoplastic resin. Thermoplastic resin may comprise any one of a variety of materials including, but not limited to, acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material, acrylics, fluorocarbons, polyamides, polyolefins, polyesters, polycarbonates, polyurethanes, polyetherimides, polyethersulfone, polysulfone, and polyphenylsulfone. Thermosetting resin may also be comprised of a variety of materials including, but not limited to, polyurethanes, phenolics, polyimides, sulphonated polymer, a conductive polymer, benzoxazines, bismaleimides, cyanate esters, polyesters, epoxies, and silsesquioxanes. The reinforcing fibers of the composite base member 202 may be formed of polymeric material (e.g., plastic), glass, ceramic material, carbon (e.g., graphite), metallic material, or any combination thereof. In view of the above-mentioned material compositions for the resin and the reinforcing fibers, a composite base member 202 may be made from any fiber/resin material combination including, but not limited to, fiberglass/epoxy, carbon/epoxy, carbon/bismaleimide, and fiberglass/phenolic.

As mentioned above, a composite base member 202 (FIGS. 6-7) may be formed of two composite channels 208

(FIGS. 6-7) arranged in back-to-back relation to each other. In the example of FIGS. 5-7, the composite channels 208 (FIGS. 6-7) each have an L-shaped cross-section which, when assembled, define a T-shaped cross section 126 (e.g., a blade section) of a cured composite structure 110 such as a composite stringer 116. However, in other examples (e.g., FIG. 35-37), one or more of the composite channels 208 of a composite base member 202 may have a C-shaped cross-section, a Z-shaped cross-section, or any one of a variety of alternative cross-sectional shapes. Composite channels 208 may be assembled to form any one of a variety of different cross-sectional shapes of a cured composite structure 110 such as a J-shaped cross section 128 (FIG. 35), an I-shaped cross section 130 (FIG. 36), or a hat-shaped cross-section 132 (FIG. 37). The cured composite structure 110 may be provided in any length. As described below, any number of radius filler segments 300 may be placed in end-to-end relationship within a radius cavity 204 to form a continuous radius filler element 330 of any length, including lengths of up to 100 feet or more. As described below, the length of the individual radius filler segments 300 may be based on practicalities associated with manufacturing, handling, and/or installing the radius filler segments 300.

Referring still to FIGS. 5-7, regardless of cross-sectional shape, each composite channel 208 has a web portion 118 and at least one flange portion 122. Each web portion 118 and flange portion 122 are interconnected by a radiused web-flange transition 124. When composite channels 208 are assembled in back-to-back relationship, the web-flange transitions 124 of the back-to-back composite channels 208 define the above-mentioned lengthwise V-shaped notch which is referred to herein as the radius cavity 204. To improve the strength characteristics of a cured composite structure 110, the radius cavity 204 contains the continuous radius filler element 330.

The radius filler element 330 is a homogenous structure formed of thermoplastic material. The radius filler element 330 has a generally triangular cross-sectional shape having opposing concave surfaces 304 configured complementary to the convex surfaces of the opposing web-flange transitions 124 that define the cross-sectional shape of the radius cavity 204. In some examples, a radius filler element 330 (e.g., made up of a segment series 316 of end-to-end radius filler segments 300) may extend continuously along an entire length of the composite base member 202. The thermoplastic material of the radius filler segments 300 that make up the continuous radius filler segments 300 may be provided in any one of a variety of compositions including, but not limited to, acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), and copolymeric material.

The thermoplastic material of the radius filler element 330 may optionally contain fibers (not shown) or other filler material distributed throughout the radius filler element 330. The fibers may be chopped fibers which may be randomly oriented. The fibers may be formed of any one of a variety of materials including polymeric material (e.g., plastic), glass, ceramic material, metallic material, or any combination thereof. In some examples, the radius filler element 330 may be devoid of unidirectional reinforcing fibers extending along a lengthwise direction of the radius filler element 330. However, in other examples described below, the radius filler element 330 may include unidirectional reinforcing fibers.

The absence of unidirectional reinforcing fibers in the radius filler element 330 may reduce the load-carrying capability of the radius filler element 330, including the load-carrying capability along the lengthwise or axial direction. In this regard, the radius filler element 330 may be described as being non-structural in the sense that the radius filler element 330 may have a relatively low or negligible contribution to the axial strength, axial stiffness, and/or bending stiffness of the cured composite structure 110.

For the presently-disclosed cured composite structure 110, the radius filler element 330 has a Young's modulus (i.e., modulus of elasticity) that is lower than the Young's modulus of the composite base member 202 (e.g., of the cured composite structure) along the axial or lengthwise direction of the radius filler element 330. Alternatively or additionally, the radius filler element 330 has a percent elongation at failure (e.g., along the axial or lengthwise direction) that is higher than the present elongation at failure of the composite base member 202 of the cured composite structure 110. In the present disclosure, the transverse direction is perpendicular to the axial or lengthwise direction of the radius filler element 330. The presently-disclosed radius filler element 330 may be softer and/or more ductile than the composite base member 202 of the cured composite structure 110, which may render the radius filler element 330 less prone to cracking, as described below.

Advantageously, a radius filler element 330 having a Young's modulus that is lower than that the Young's modulus of the composite base member 202 allows the cured composite structure 110 to deform significantly in the direction of a load without failure of the radius filler element 330. Such failure of the radius filler element 330 may include microcracking which may compromise the structural integrity of the cured composite structure 110 when loaded. Such microcracking may propagate to the side surface interfaces 308 between the radius filler element 330 and the composite base member 202. Loading of the cured composite structure 110 may include loads applied to the cured composite structure 110 during service, such as flight loads imposed on a composite wing panel 114 of an aircraft 100 (FIG. 1). Alternatively or additionally, loading of the cured composite structure 110 may also occur due to due to differential shrinkage of the radius filler element 330 relative to the composite base member 202 during curing (e.g., chemical shrinkage) and/or during cool-down (e.g., thermal shrinkage) as the cured composite structure 110 cools down from an elevated cure temperature to room temperature.

As may be appreciated, cracking at the side surface interfaces 308 may compromise the load-carrying capability of the cured composite structure 110. For example, cracking at the side surface interfaces 308 may compromise the ability of the cured composite structure 110 to withstand a pulloff load 420 exerted by the composite stringers 116 on a composite skin panel 224. As shown in FIG. 5, such pulloff loads 420 may be oriented perpendicular to the plane of a composite skin panel 224 and may urge the composite base member 202 away from the composite skin panel 224 with a tendency to separate or de-bond the composite base member 202 from the composite skin panel 224. Advantageously in the present disclosure, a radius filler element 330 having a Young's modulus that is less than that of the composite base member 202 allows the cured composite structure 110 to strain significantly without the radius filler element 330 carrying some of the load. In this regard, the presently-disclosed radius filler element 330 has a reduced risk of cracking which thereby improves the strength and durability of the cured composite structure 110. Although the above description indicates that the radius filler element 330 may be devoid of unidirectional reinforcing fibers, in some examples, a radius filler element 330 may include unidirectional reinforcing fibers if such reinforcing fibers result in the radius filler element 330 having a Young's modulus that is relatively closely matched (e.g., within 10%) to the Young's modulus of the composite base member 202.

As an alternative to or in addition to the above-described Young's modulus arrangement, the radius filler element 330 may be described as having a percent elongation at failure (e.g., in the axial or lengthwise direction) that is greater than the percent elongation at failure of the composite base member 202. Percent elongation at failure may be defined as the percentage increase in length (i.e., from its original length) of a component (not shown) at the breaking point, and is a measure of the ability of the component to stretch prior to breaking. In the present disclosure, a high percent elongation at failure of the radius filler element 330 relative to that of the composite base member 202 represents a reduced axial stiffness of the radius filler element 330 relative to the axial stiffness of the composite base member 202. In the context of composite stringers 116 coupled to a composite skin panel 224 as shown in FIG. 5, a relatively high percent elongation at failure of the radius filler element 330 means that the stringers may axially strain a significant amount without the risk of failure (e.g., cracking) of the radius filler elements 330. In addition, the presently-disclosed radius filler element 330 allows for reduced axial stiffness at the terminal ends of the composite stringers 116 which reduces or prevents stress concentrations in the composite skin panel 224 at the terminal ends.

In some examples, the radius filler element 330 of a cured composite structure 110 may be fused to one or more portions of the composite base member 202 during curing of the structural assembly 200. More specifically, as described in greater detail below, one or more of the radius filler side surfaces 302 (e.g., the concave surfaces 304) of the radius filler element 330 may be fused to the base member surfaces 206 at the web-flange transitions 124 of the composite base member 202 as a result of the application of heat 412 (FIG. 23) during the curing of the structural assembly 200. Alternatively or additionally, as a result of the curing of the structural assembly 200, the flat surface 306 of the radius filler element 330 may be fused to the panel surface 226 of a composite panel 220 such as a composite strip 222 that may assembled to the composite base member 202.

Referring to FIG. 8, shown is a flowchart of operations included in a method 500 of manufacturing a cured composite structure 110. The method 500 is described in the context of manufacturing a composite stringer 116 as the cured composite structure 110. However, the method 500 may also be implemented for manufacturing a cured composite structure 110 made up of a composite skin panel 224 and a plurality of composite stringers 116 that may be bonded, co-bonded or co-cured with the composite skin panel 224.

Referring to FIGS. 9-10, step 502 of the method includes inserting a plurality of radius filler segments 300 into the radius cavity 204 extending along a length of a composite base member 202 to form a structural assembly 200. Although FIG. 9 shows three (3) radius filler segments 300 being installed in the radius cavity 204, any number of radius filler segments 300 may be installed in end-to-end relation within a radius cavity 204. As mentioned above, the length of individual radius filler segments 300 may be based on practicalities associated with manufacturing and handling the radius filler segments 300. For example, the radius filler segments 300 may be provided in a length of 3 feet to allow for manual handling and installation of the individual radius filler segments 300 into the radius cavity 204. However, one or more of the radius filler segments 300 may be provided in a length of 5-10 feet although longer lengths (e.g., approximately 15 feet) are contemplated. The length of the individual radius filler segments 300 may be dependent in part upon the total length of the composite base member 202 which, in some examples, may be 30 feet or more such as a 100-foot-length mentioned of a composite stringers 116 of a wing panel 114. As described above, each radius filler segment 300 has opposing segment ends 312 each having an end surface 314.

The radius filler segments 300 are formed of the above-described thermoplastic material. As noted above, the thermoplastic material of the radius filler segments 300 has a Young's modulus that is less than the Young's modulus of the composite base member 202 of the cured composite structure 110. Additionally or alternatively, the thermoplastic material of the radius filler segments 300 has a percent elongation at failure that is greater than the percent elongation at failure of the composite base member 202 of the cured composite structure 110.

The cross-sectional shape and size of the radius filler segments 300 may be complementary to (e.g., matches) the cross-sectional shape and size of the radius cavity 204. The back-to-back composite channels 208 that define the composite base member 202 in FIGS. 9-10 may be supported on a tool (not shown) during the installation of the radius filler segments 300. In some examples, the radius filler segments 300 may be inserted one at a time in the radius cavity 204. The segment ends 312 of adjacent pairs of the radius filler segments 300 are preferably placed in abutting contact with each other to facilitate fusing of the segment ends 312 during curing of the composite base member 202. However, in other examples, relatively small gaps (e.g., less than 0.10 inch wide—not shown) may exist between the segments of one or more end-to-end pairs of radius filler segments 300. Gaps that exist between one or more adjacent pairs of radius filler segments 300 may be at least partially filled by the thermoplastic material if heated to a temperature that reduces the viscosity of the thermoplastic material to an extent allowing the thermoplastic material to fill such gaps during curing of the composite base member 202. In any one of the examples disclosed herein, it is not necessary for the thermoplastic material of the radius filler segments 300 to be heated to its melting temperature in order for the segment ends 312 to fuse together. The temperature at which the segment ends 312 fuse together may be the glass transition temperature of the thermoplastic material, and which may be lower than the melting temperature.

Referring to FIG. 11, the method may optionally include assembling a composite panel 220 such as a composite strip 222 over the composite base member 202 to encapsulate the radius filler segments 300 within the radius cavity 204. The combination of the composite base member 202, the radius filler segments 300, and the composite strip 222 may define the structural assembly 200 for curing into a cured composite structure 110 as described below. In an alternative example not shown, the composite panel 220 may be a composite skin panel 224 (FIG. 28) having a larger width than the composite strip 222 such that a plurality of composite base members 202 (containing radius filler segments 300) may be assembled to the composite skin panel 224 to form a structural assembly 200 for heating and/or curing to form a cured composite structure 110.

Referring to FIGS. 12-13, step 502 of inserting the radius filler segments 300 into the radius cavity 204 may include interlocking the segment ends 312 of end-to-end pairs of the plurality of radius filler segments 300 via interlocking features 320 included on the segment ends 312 of the radius filler segments 300. For example, the installation of a radius filler segment 300 into the radius cavity 204 may include engaging the interlocking feature 320 on the segment end 312 of one radius filler segment 300 to the interlocking feature 320 on the segment end 312 of another radius filler segment 300 previously installed in the radius cavity 204. The interlocking of the segment ends 312 may ensure that the end surfaces 314 of each opposing pair of segment ends 312 are in contact with each other to improve the fusing together of the end surfaces 314. In addition, the interlocking features 320 may prevent lengthwise shifting of the position of the radius filler segments 300 within the radius cavity 204. The interlocking features 320 may be provided in any one of a variety of different configurations.

For example, referring to FIGS. 14-15, the interlocking of the radius filler segments 300 via the interlocking features 320 may include engaging a tab 322 on the segment end 312 of one radius filler segment 300 with a pocket or recess 324 on the segment end 312 of an adjacent radius filler segment 300. As described in greater detail below, the interlocking features 320 may be integrally formed on the segment ends 312 during manufacturing of the radius filler segments 300 using any one a variety of manufacturing methods, as described below. In the example shown, the tab 322 has a dovetail configuration 326 configured to nest within a recess 324 also having a dovetail configuration 326 and sized to provide a snug fit of the tab 322 within the recess 324. However, the interlocking features 320 may be provided in any one a variety of different sizes, shapes, and configurations, and are not limited to a tab 322 and a recess 324 having a dovetail configuration 326.

The method may include manufacturing the radius filler segments 300 via machining, three-dimensional printing, die extrusion, injection molding, and/or using any one of a variety of other manufacturing techniques. Three-dimensional printing may include additive manufacturing of radius filler segments 300 such as by stereolithography, selective laser sintering, fused filament fabrication, or any one of a variety of other additive manufacturing techniques. Advantageously, three-dimensional printing and/or injection molding allows for manufacturing each radius filler segment 300 to closely match the shape and size defined in an engineering model (e.g., computer-aided-design model) of the radius cavity 204.

Figure 16:
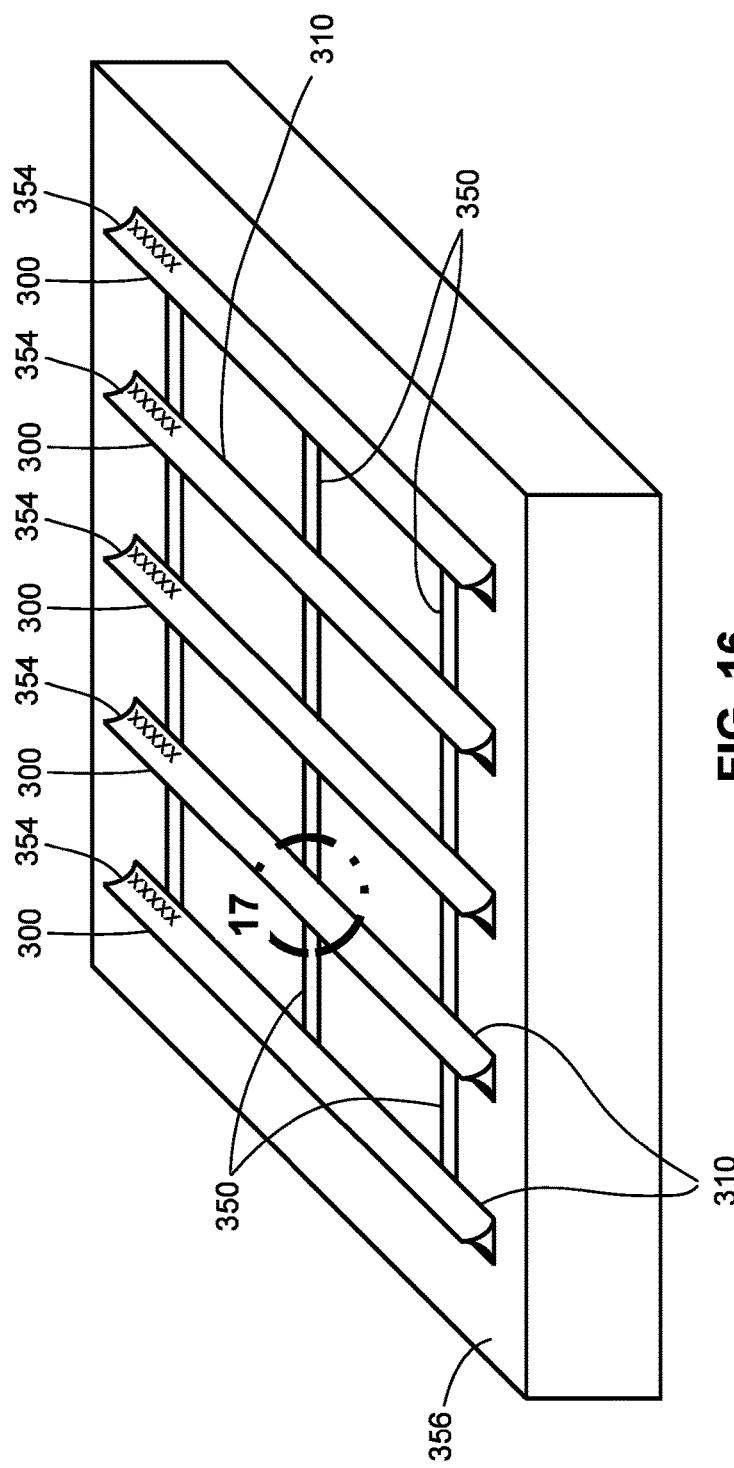
FIG. 16 is a perspective view of an example of a plurality of radius filler segments three-dimensionally printed on a build plate and interconnected by a plurality of breakaway tabs formed via the three-dimensional printing of the radius filler segments.

Referring to FIG. 16, shown is an example of a plurality of radius filler segments 300 three-dimensionally printed on a build surface 356 which may be a mesh plate or a solid sheet or block of material (not shown). In some examples, all of the radius filler segments 300 for a composite base member 202 may be printed on the build surface 356. Advantageously, the radius filler segments 300 for a relatively long composite stringer 116 (e.g., 60 feet) may be printed on relatively small (e.g., 2 feet by 3 feet) build surface 356. In still further examples, all of the radius filler segments 300 for one shipset of a cured composite structure 110 (e.g., a composite wing panel 114) may advantageously be printed on several build surfaces 356, depending upon the size of the of the cured composite structure 110 and the quantity of composite base members 202. At least some of the radius filler segments 300 may be printed on a build surface 356 in spaced parallel relation to each other, and may be spaced apart from each other by up to several inches or more. Alternatively, at least some of the radius filler segments 300 may be nested tightly together or spaced relatively closely together.

In FIG. 16, the radius filler segments 300 may include identifying information 354 such as a unique serial number that may be added to each radius filler segment 300 during or after the manufacturing of the radius filler segment 300. Each serial number may identify the relative location of each radius filler segment 300 within a segment series 316 (FIGS. 9-10) of radius filler segments 300 in the radius cavity 204 of a corresponding composite base member 202. In this regard, the serial numbers may identify the composite base member 202 into which each radius filler segments 300 is to be installed. The identifying information 354 may be added by ink-stamping, machining, embossing, engraving, stamping, and/or by three dimensionally printing as sunken or raised indicia, or by the use of contrasting color media.

The manufacturing of the plurality of radius filler segments 300 may optionally include manufacturing the plurality of radius filler segments 300 with breakaway tabs 350 interconnecting the radius filler segments 300. The breakaway tabs 350 may be located at spaced intervals along the length of adjacent pairs of radius filler segment 300. In the example of FIG. 16, the breakaway tabs 350 may extend between the side edges 310 of adjacent radius filler segments 300. Advantageously, the breakaway tabs 350 provide a means for keeping the radius filler segments 300 together as a shipset prior to separation from each other at the breakaway tabs 350 for individual insertion into the radius cavity 204. The breakaway tabs 350 may be additively manufacturing such as via three-dimensional printing during the printing of the radius filler segments 300. Alternatively or additionally, the interlocking features 320 (e.g., FIGS. 12-15) may also be additively manufactured via three-dimensional printing during printing of the radius filler segments 300.

Figure 17:
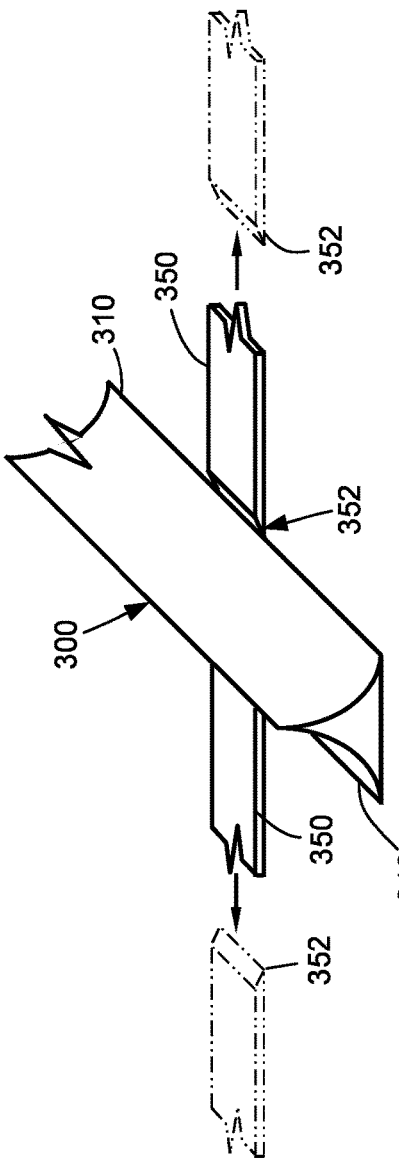
FIG. 17 is a magnified view of the portion of the radius filler segment identified by reference numeral 17 of FIG. 16 and illustrating a weakened portion located along a side edge of the radius filler segment for separating the breakaway from the radius filler segment.

Referring to FIG. 17, each breakaway tab 350 may have one or more weakened portions 352 to facilitate separation of the radius filler segments 300 from each other. In the example shown, each breakaway tab 350 may have a notch or groove extending across a width of the breakaway tab 350 proximate the side edge 310 of the radius filler segment 300 at the intersection of the breakaway tab 350 with the radius filler segment 300. The cross-section of the weakened portion 352 may be thin enough to be broken away by manually bending back-and-forth until the weakened portion 352 fractures, yet the cross-section of the weakened portion 352 may be thick enough to allow a shipset of the radius filler segments 300 to be lifted off the build surface 356 as a unit and carried and/or handled without causing the individual radius filler segments 300 to separate from each other.

Figure 20:
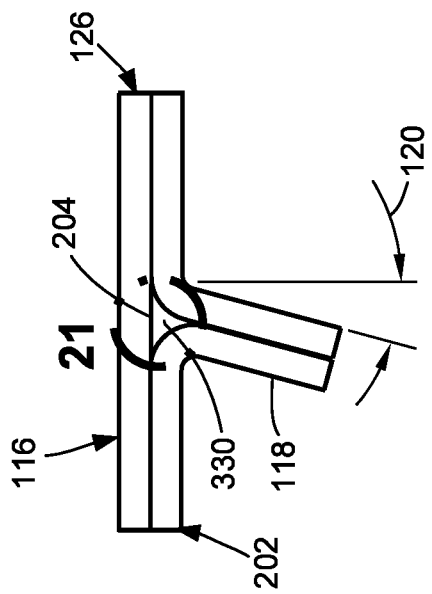
FIG. 20 is a sectional view of an example of a composite stringer taken along line 26-26 of FIG. 3 and illustrating the web portions oriented at a web angle that is non-perpendicular to the flange portions of the composite base member.
Figure 21:
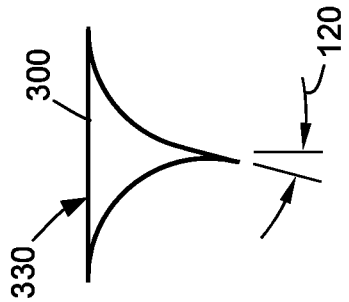
FIG. 21 is a magnified view of the continuous radius filler element in FIG. 20.
Figure 18:
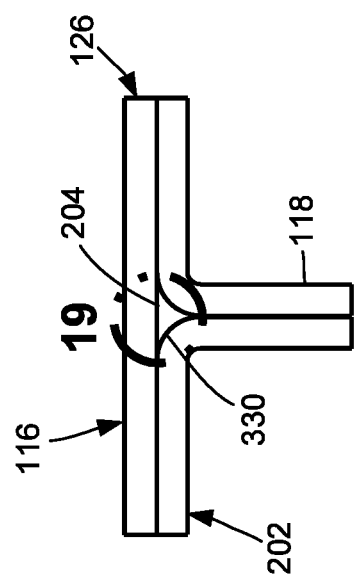
FIG. 18 is a sectional view of an example of a composite stringer taken along line 18-18 of FIG. 3 and illustrating the composite channels each having a web portion oriented perpendicular to a flange portion of the composite base member.
Figure 19:
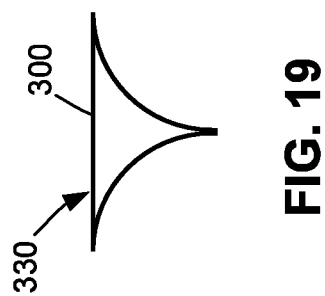
FIG. 19 is a magnified view of the continuous radius filler element in FIG. 18.

Referring to FIGS. 18-21, in some examples, the radius cavity 204 of a composite base member 202 may have a cross-sectional shape and/or a cross-sectional size that is different at two or more locations along the lengthwise direction of the composite base member 202. For example, the cross-sectional size of the radius cavity 204 may taper along the lengthwise direction. In another example, FIGS. 18 and 20 show a composite stringer 116 (FIG. 3) having a T-shaped cross section 126 in which the local web angle 120 of the web portion 118 varies along the lengthwise direction of the composite stringer 116. FIGS. 19 and 21 show the variation in the cross-sectional shape of the radius filler segment 300 corresponding to the different local web angle 120 in FIGS. 18 and 20. In such example, step 502 of manufacturing radius filler segments 300 may include manufacturing the radius filler segments 300 with a cross-sectional shape and cross-sectional size that is complementary to the cross-sectional shape and cross-sectional size of the radius cavity 204 at the locations of installation of the radius filler segments 300 into the radius cavity 204. In one example, the radius filler segments 300 may be manufactured with a cross-sectional shape that matches the local web angle 120 of the web portion 118 of the composite base member 202. In addition, in the above-described manufacturing techniques, the radius filler segments 300 may be sized and shaped such that the total volume of the radius filler segments 300 is substantially equivalent to, or at least as large as, the volume of the radius cavity 204 after curing of the composite base member 202. In this regard, the radius filler segments 300 are manufactured in a cross-sectional size and/or shape that accounts for resin shrinkage in the composite base member 202.

Advantageously, three-dimensional printing, injection molding, machining, and certain other manufacturing techniques allow for manufacturing radius filler segments 300 for which the cross-sectional shape and/or size of the radius cavity 204 varies along the lengthwise direction of the composite base member 202. Manufacturing radius filler segments 300 by die extrusion may result in a constant cross-sectional shape and/or a constant cross-sectional size and which may be appropriate for examples where the radius cavity 204 also has a substantially constant cross-sectional shape and/or substantially constant cross-sectional size. However, the thermoplastic material may have enough flexibility to allow radius filler segments 300 of constant cross-sectional shape and/or size to be used in a composite base member 202 having a relatively small variations in the cross-sectional shape and/or cross-sectional size of the radius cavity 204.

Advantageously, the thermoplastic material of the radius filler segments 300 is relatively insensitive to out-time and temperature, unlike thermosetting materials which must stored at a relatively cold temperature (e.g., in a freezer or refrigerator at 0° F.) to prevent premature curing of the thermosetting material prior to layup. In view of the insensitivity of thermoplastic material to out-time and temperature, the manufacturing of the radius filler segments 300 may be performed off-site and in advance of the need for assembly with a composite base member 202 at a production facility. As known in the art, the out-time of a composite material (e.g., a thermosetting prepreg) may be described as the amount of time that the composite material may be taken out of cold storage and exposed to ambient temperature and which may reduce the shelf life of the composite material. Furthermore, the ability to manufacture the radius filler segments 300 in relatively short lengths may be conducive to manufacturing the radius filler segments 300 off-site, thereby saving valuable floor space and eliminating capital costs associated with on-site equipment for manufacturing radius filler segments 300.

Referring to FIG. 22, shown is an example of a structural assembly 200 prior to curing. As described above, the structural assembly 200 comprises an uncured composite base member 202 having a base member cure temperature and a radius cavity 204 extending along a length of the composite base member 202. The uncured composite base member 202 may include two composite channels 208 configured to be placed in back-to-back relation to each other. As described above, each composite channel 208 has a web portion 118 (FIG. 6) and at least one flange portion 122 (FIG. 6) interconnected by a web-flange transition 124 (FIG. 6). The web portions 118 may be assembled in back-to-back relation to each other and the web-flange transitions 124 collectively form the radius cavity 204 (FIG. 9), as mentioned above.

The structural assembly 200 also includes a plurality of radius filler segments 300 (FIG. 9) configured to be inserted into the radius cavity 204 in end-to-end arrangement (FIGS. 9-10). In some examples, the radius filler segments 300 may have a length of between 3-10 feet which may facilitate manufacturing, storing, shipping, and/or installing the radius filler segments 300. However, the radius filler segments 300 may have a length of less than 3 feet. In still other examples, the radius filler segments 300 have a length of between 5-15 feet. However, the radius filler segments 300 may be longer than 15 feet.

As also described above, each of the plurality of radius filler segments 300 has opposing segment ends 312 (FIGS. 9-10). As shown in FIGS. 12-15, in some examples, the segment ends 312 of the radius filler segments 300 have interlocking features 320 configured to engage with each other and interlock the end-to-end pairs of radius filler segments 300 (e.g., FIGS. 12-13). In the example of FIGS. 14-15, the interlocking features 320 comprise a tab 322 incorporated into the segment end 312 of one of the radius filler segments 300, and a recess 324 incorporated into the segment end 312 of an adjacent one of the radius filler segments 300. The tab 322 is configured to nest within the recess 324 for interlocking the radius filler segments 300. However, as mentioned above, the interlocking features 320 may be provided in any one of a variety of different configurations, and are not limited to the tab 322 and recess 324 arrangement shown in FIGS. 12-15.

Prior to insertion into the radius cavity 204 of a composite base member 202, the radius filler segments 300 may be removably interconnected by breakaway tabs 350 as shown in FIGS. 16-17. As described above, the breakaway tabs 350 may interconnect the radius filler segments 300 and thereby allow the radius filler segments 300 to be kept together as a set, and separated just prior to installation into a radius cavity 204 of the composite base member 202. The breakaway tabs 350 may each include at least one weakened portion 352 for separating the radius filler segments 300 from each other prior to installation in the radius cavity 204.

As shown in FIGS. 18-21, the radius cavity 204 of a structural assembly 200 may have a cross-sectional shape and/or a cross-sectional size that is different at two or more locations along the lengthwise direction of the uncured composite base member 202. For example, the cross-sectional shape and/or the cross-sectional size may gradually change along the lengthwise direction of the composite base member 202. The cross-sectional shape and cross-sectional size of the radius filler segments 300 may be complementary to the cross-sectional shape and cross-sectional size of the radius cavity 204. For example, as shown in FIGS. 18-21, the radius filler segments 300 may be manufactured with a cross-sectional shape that matches the local web angle 120 which may gradually change along the length of the composite base member 202.

Each of the radius filler segments 300 is homogenous and is formed of the above-described thermoplastic material. As described above, the thermoplastic material of the radius filler segments 300 has at least one of the following properties: (1) a Young's modulus that is less than the Young's modulus of the composite base member 202 of the cured composite structure 110, and/or (2) a percent elongation at failure that is greater than the percent elongation at failure of the composite base member 202 of the cured composite structure 110.

As described in greater detail below, in a structural assembly 200, the thermoplastic material has a glass transition temperature at which the segment ends 312 of end-to-end pairs of the plurality of radius filler segments 300 fuse together. The base member cure temperature is at least as high as the glass transition temperature of the thermoplastic material. During heating of the structural assembly 200, the segment ends 312 of the radius filler segments 300 fuse together as described in greater detail below. The fusing together of the radius segment ends 312 result in end-to-end joining of the radius filler segments 300 to form the above-described continuous radius filler element 330 of a cured composite structure 110.

Figure 24:
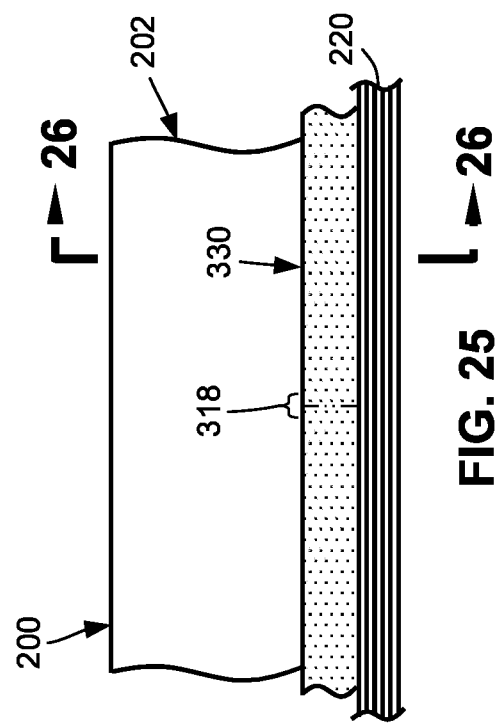
FIG. 24 is a sectional view of the structural assembly taken along line 24-24 of FIG. 23 during the application of heat and pressure, and illustrating the segment ends of a pair of radius filler segments in abutting contact with each other to define an end-to-end interface between the end surfaces of the segment ends.
Figure 25:
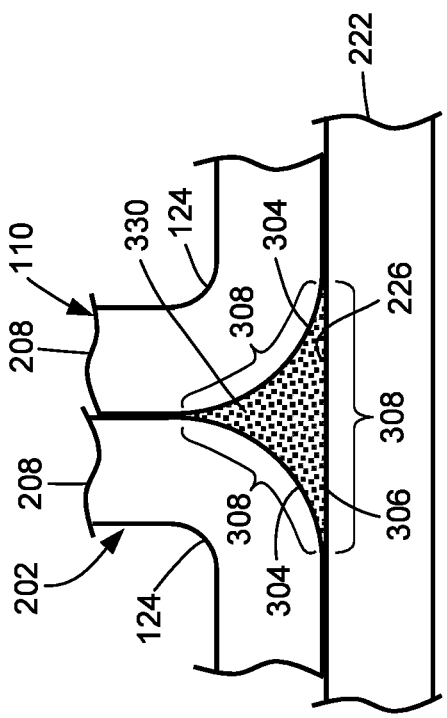
FIG. 25 is a sectional view of a cured composite structure after curing of the structural assembly of FIG. 24 and illustrating the segment ends of the radius filler segments fused together at the end-to-end interface as a result of heating the structural assembly.

Referring to FIG. 23, step 504 of the method 500 (e.g., FIG. 8) of manufacturing a cured composite structure 110 includes heating the structural assembly 200 to at least a base member cure temperature that causes the segment ends 312 (FIGS. 9-10) of end-to-end pairs (FIG. 24) of the plurality of radius filler segments 300 to fuse together (FIG. 25) at the end-to-end interface 318 and form a continuous radius filler element 330 (FIG. 25). As shown in FIG. 23, the structural assembly 200 includes the composite base member 202 and the radius filler segments 300 which may be encapsulated between a composite panel 220 and the back-to-back composite channels 208. Although FIG. 23 shows the structural assembly 200 as a composite base member 202 (e.g., cured or uncured) having back-to-back composite channels 208 and a composite strip 222 encapsulating the radius filler segments 300, in another example not shown, the structural assembly 200 may be a composite skin panel 224 (e.g., cured or uncured) to which a plurality of composite base members 202 and corresponding radius filler segments 300 (and optional composite strip 222). Regardless of the configuration, the structural assembly 200 may be mounted on a cure tool 400, and one or more caul plates 402 may optionally be positioned on the composite base member 202. For example, FIG. 23 shows a pair of L-shaped caul plates 402 respectively positioned on the composite channels 208 of the composite base member 202. A vacuum bag 404 and one or more processing layers (e.g., a breather layer, a release layer—not shown) may be placed over the assembly to facilitate curing. The perimeter of the vacuum bag 404 may be sealed to the cure tool 400 using an edge seal 406 such as tape sealant or tacky tape. Vacuum fittings (not shown) may be mounted to the vacuum bag 404 and may be fluidly coupled to a vacuum source 408 such as a vacuum pump (not shown).

The structural assembly 200 may be heated before and/or during the drawing of a vacuum (e.g., via the vacuum source 408) on the space enclosed by the vacuum bag 404 and containing the structural assembly 200. The application of vacuum pressure may generate compaction pressure 410 on the structural assembly 200 for consolidating the composite material and radius filler segments 300 while drawing moisture, trapped air, and/or volatiles out of the structural assembly 200. In some examples, the assembly (e.g., the structural assembly 200 vacuum bagged to the cure tool 400) may be positioned in an autoclave for heating and consolidating the structural assembly 200 during the curing process. In other examples, the structural assembly 200 may be cured in an out-of-autoclave process. In some examples, the structural assembly 200 may be cured in an oven.

To cure a structural assembly 200, heat 412 may be applied by any one a variety of different mechanisms including, but not limited to, forced air heating, convection heating, induction heating, or other types of heating. In some examples, a structural assembly 200 may be heated from ambient temperature (e.g., room temperature 68° F.) to at least the base member cure temperature of the composite base member 202, and may be maintained for a predetermined temperature hold period to allow the composite base member 202 to cure in allow the segment ends 312 (FIGS. 9-10) of the radius filler segments 300 to fuse together. In other examples involving a composite base member 202 formed of prepreg material that cures at or slightly above room temperature, the application of heat 412 may involve removing the prepreg material from cold storage to a room temperature environment and allow the temperature of the prepreg material to increase to room temperature for laying up and curing the composite base member 202. Heat 412 may be applied as required to allow the fusing together of the segment ends 312 of the radius filler segments 300 and to promote the curing of the prepreg material.

Referring to FIGS. 24-25, in order to promote the fusing of the segment ends 312 of adjacent pairs of radius filler segments 300 at each end-to-end interface 318 (FIG. 24), the base member cure temperature may be at least as high as the glass transition temperature of the thermoplastic material of the radius filler segments 300. The glass transition temperature may be described as the temperature at which the thermoplastic material transitions from a relatively hard, brittle or solid state to a softer, rubbery, or viscous state. The viscous nature of the thermoplastic material at or above its glass transition temperature may allow the thermoplastic material at the end surfaces 314 (FIG. 24) to intermingle and fuse together at the end-to-end interface 318 of the radius filler segments 300 as shown in FIG. 25, to form a continuous radius filler element 330 that extends along the length (e.g., the entire length) of the composite base member 202. In other examples, the cure temperature may be at least as high as the melting temperature of the thermoplastic material of the radius filler segments 300. Alternatively or additionally, in some examples, the cure temperature may be at least as high as the temperature at which the thermoplastic material of the radius filler segments 300 may flow into any gaps (not shown) or surface voids that may exist on or between the radius filler segments 300 and the composite base member 202. The structural assembly 200 may be maintained at the elevated temperature (e.g., at least the base member cure temperature) at least for a temperature hold period (e.g., during one or more curing stages) that allows the end surfaces 314 of adjacent radius filler segments 300 to intermingle and fuse to each other.

Figure 26:
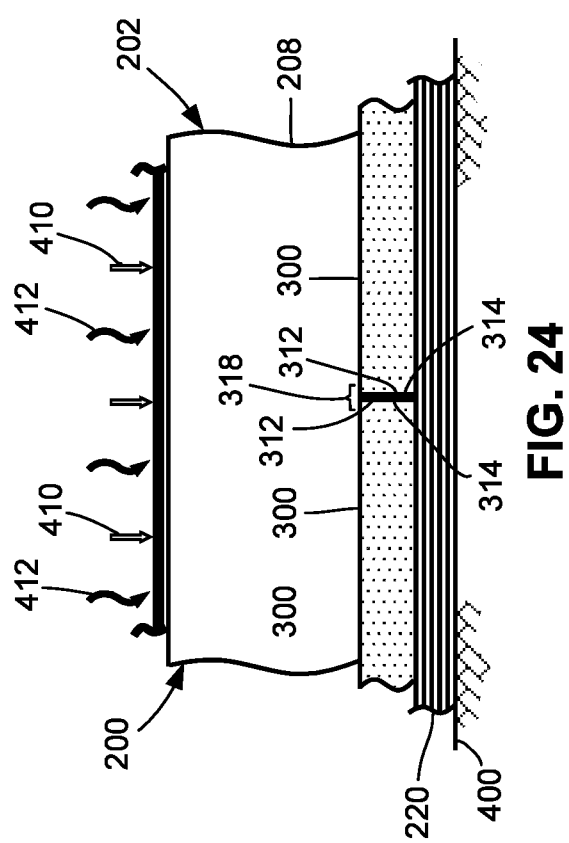
FIG. 26 is a sectional view of the cured composite structure taken along line 26-26 of FIG. 25 and illustrating a continuous radius filler element formed by the fusing together of the end-to-end radius filler segments during the application of heat.
Figure 27:
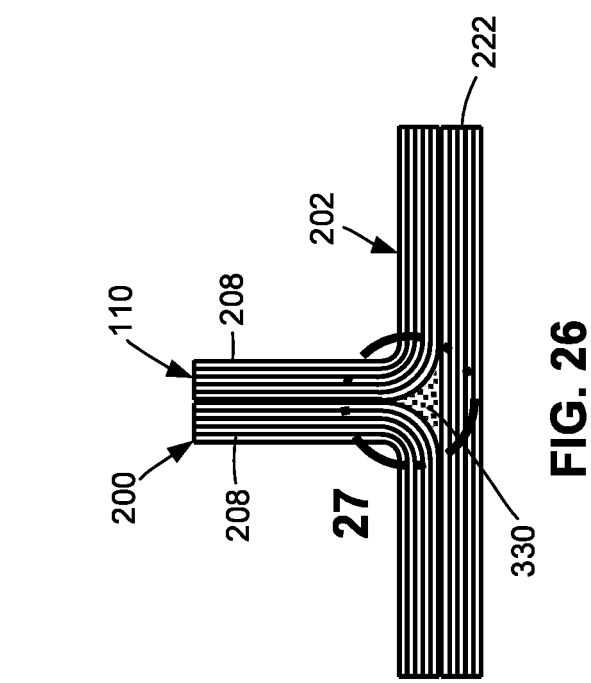
FIG. 27 is a magnified view of the portion of the cured composite structure identified by reference numeral 27 of FIG. 26 and illustrating the radius filler side surfaces of the radius filler fused to the base member surfaces and/or panel surface respectively of the composite base member and composite strip.

Referring to FIGS. 26-27, in some examples, step 504 of heating the structural assembly 200 at least to the base member cure temperature may also include heating the structural assembly 200 to a temperature that results in the radius filler segments 300 at least partially adhering or fusing to the composite base member 202. For example, FIG. 26 shows a cross-section of the cured composite structure 110 illustrating the continuous radius filler element 330 encapsulated by the composite strip 222 and the composite channels 208. FIG. 27 illustrates the side surface interface 308 between each concave surface 304 of the continuous radius filler element 330 and the outer surface of the web-flange transition 124 of each composite channel 208. Also shown is the side surface interface 308 between the flat surface 306 of the continuous radius filler element 330 and the panel surface 226 of the composite strip 222 on the bottom of the cured composite structure 110. The continuous radius filler element 330 may be fused to the composite base member 202 along any one of the above-described side surface interfaces 308 which may significantly improve the strength and durability of the cured composite structure 110.

For a composite base member 202 formed of a thermosetting material, the base member cure temperature may be in the range 150° F. to 350° F. For example, one type of thermosetting material may have a base member cure temperature of approximately 150° F., and another type of thermosetting material may have a base member cure temperature of approximately 250° F. Still further, another type of thermosetting material may have a cure temperature of approximately 350° F. and which may be compatible with radius filler segments 300 formed of acrylonitrile butadiene styrene (ABS) which may allow the segment ends 312 to fuse together at approximately 350° F.

For composite base members 202 formed of composite prepreg material that cures at room temperature (e.g., 68-72° F.) or slightly above (e.g., 80-85° F.), the application of heat 412 may involve moving the composite prepreg material out of cold storage (e.g., from a refrigerator at 40° F.) and allowing the composite prepreg material to heat up at least to room temperature for laying up the composite prepreg material into the composite base members 202 prior to installing the radius filler segments 300 and curing the structural assembly 200. Advantageously, the thermoplastic material may be selected such that the standard curing process (e.g., specified cure temperatures and hold times) for the material system of the composite base member 202 may be unchanged. However, in some examples, additional heat may be applied to a structural assembly 200 as needed for fusing together the segment ends 312 of the thermoplastic radius fillers. For configurations in which the composite base members 202 are made of a composite prepreg material that cures at temperatures slightly above room temperature (e.g., 80-85° F.), additional heat may be applied to the structural assembly 200 to cause the radius filler segments 300 to fuse together.

Step 506 of the method 500 includes allowing the structural assembly 200 to cure and cool (e.g., to room temperature) to form the cured composite structure 110 containing a continuous radius filler element 330 as a result of the fusing together of the radius filler segments 300. As mentioned above, the structural assembly 200 may be cured inside an autoclave or the structural assembly 200 may be cured in an out-of-autoclave process. In some examples, a structural assembly 200 containing radius filler segments 300 may be cured using a multi-stage curing process. For example, step 504 of heating the structural assembly 200 may include heating the structural assembly 200 from ambient temperature to a first temperature (e.g., an intermediate temperature) and holding at the first temperature for a first hold period during the first stage of a two-stage curing process. The first stage may allow for outgassing of the composite base member 202. The first temperature may be lower than the temperature at which the thermosetting resin of the composite base member 202 starts to cross-link and polymerize (e.g., cure). The method may further include heating the structural assembly 200 from the first temperature to a second temperature which may be the base member cure temperature, and holding at the second temperature for a second hold period during a second stage of the two-stage curing process. The second stage may allow the structural assembly 200 to cure to form the cured composite structure 110 which may be actively cooled and/or passively cooled to result in the cured composite structure 110. Either the first temperature or the second temperature is as high as the glass transition temperature of the thermoplastic material of the radius filler segments 300 to allow the segment ends 312 of the radius filler segments 300 to fuse together and form the continuous radius filler element 330.

In a specific example of a two-stage curing process in which the composite base member 202 is formed of graphite-epoxy prepreg, during the first stage the structural assembly 200 may be heated to a first temperature of from 260-290° F. for a first hold period of 170-190 minutes. During the second stage, the structural assembly 200 may be heated from the first temperature to a second temperature of from 340-370° F. for a second hold period of 80-100 minutes. In a preferred example, during the first stage, the first temperature may be in the range of 270-280° F. for a first hold period of 175-185 minutes. During the second stage, the second temperature may be in the range of 350-360° F. for a second hold period of 85-95 minutes.

Referring to FIGS. 28-31, shown is an example of the process of forming a panel subassembly 230 by mounting a plurality of radius filler segments 300 in end-to-end relation to each other on a composite panel 220 (e.g., cured or uncured) such as a composite skin panel 224 to form a plurality of segment series 316 arranged in spaced parallel relation to each other. In this regard, FIGS. 28-31 illustrate an alternative method for performing step 502 of inserting the radius filler segments 300 into the radius cavity 204. Referring to FIG. 28, the method includes applying location markings 328 of the side edges 310 of each of radius filler segments 300 on an composite panel 220. The application of the location markings 328 on the composite panel 220 may be performed by applying relatively light-colored markings for visibility against the relatively dark-colored composite material of the composite panel 220. For example, the location markings 328 may be applied on a cured composite panel 220 using a silver pencil.

Referring to FIG. 29, the method may also include placing radius filler segments 300 in end-to-an arrangement on the composite panel 220 in alignment with the location markings 328 previously applied to the composite panel 220. The location markings 328 may identify the segment ends 312 of each radius filler and may also identify the lateral location of each radius filler element 330 on the composite panel 220. End-to-end series of radius filler segments 300 comprises a segment series 316. As shown in FIG. 29, a plurality of segment series 316 may be formed in spaced apart relation to each other on the composite panel 220. The combination of the composite panel 220 and the radius filler segments 300 comprises a panel sub assembly 230.

Referring to FIG. 30, the method may additionally include vacuum compacting the radius filler segments 300 to the composite panel 220 to at least partially bond or lightly adhere the radius filler segments 300 in position on the composite panel 220. The process may include placing the panel subassembly 230 on a cure tool 400 and covering the panel subassembly 230 with a vacuum bag 404. The perimeter of the vacuum bag 404 may be sealed to the cure tool 400 using an edge seal 406 such as the above-mentioned tape sealant. One or more vacuum fittings (not shown) may be mounted to the vacuum bag 404 for fluidly coupling the vacuum bag 404 to a vacuum source 408 (not shown). The drawing of a vacuum on the vacuum bag 404 may compact the radius filler segments 300 against the composite panel 220 which may lightly adhere the radius filler segments 300 to the composite panel 220 and thereby prevent shifting of the positions of the radius filler segments 300 relative to each other during the process of assembling the composite base members 202 and/or during curing of the composite base members 202. Advantageously, the relatively rigid nature of the thermoplastic material of the radius filler segments 300 prevents deformation of the cross-sectional shape of the radius filler segments 300 under the compaction pressure applied by the vacuum bag 404 and which may otherwise occur with conventional radius fillers formed of laminated composite prepreg tape.

Referring to FIG. 31, the method may further include assembling a plurality of composite base members 202 (e.g., cured or uncured) to the panel subassembly 230 such that the radius filler segments 300 are received into the corresponding radius cavity 204 of the composite base members 202. The combination of the composite panel 220, the radius filler segments 300, and the composite base members 202 defines a structural assembly 200.

Referring to FIG. 32, the method may additionally include vacuum bagging the structural assembly 200 to the composite panel 220. Similar to the above-described vacuum bagging process shown in FIG. 30, the structural assembly 200 of FIG. 31 may be supported on the cure tool 400 and may be covered with a vacuum bag 404 sealed to the cure tool 400. Vacuum pressure may be drawn on the vacuum bag 404 via one or more vacuum fittings (not shown). As described above with regard to FIG. 23, the method may additionally include applying heat 412 to the structural assembly 200 to elevate the temperature to at least a base member cure temperature that causes the segment ends 312 of end-to-end pairs (e.g., FIG. 24) of the plurality of radius filler segments 300 to fuse together at the end-to-end interface 318 and form a continuous radius filler element 330 (FIG. 25) within each one of the composite base members 202, thereby forming a cured composite structure 110.

Referring to FIGS. 33-34, shown is an example of the cured composite structure 110 resulting from the curing of the structural assembly 200 of FIG. 32. The composite base members 202 may be co-bonded or co-cured to the composite skin panel 224, and which result in the fusing together of multiple radius filler segments 300 within each composite base member to form a continuous radius filler element 330 in each composite base member 202.

As mentioned above, shown in FIG. 35-37 are non-limiting examples of cross-sectional configurations of cured composite structures 110 using different variations of cross-sections of composite channels 208 for the composite base member 202. For example, FIG. 35 shows an example of a cured composite structure 110 having a J-shaped cross section 128 formed by assembling a Z-shaped composite channel with an L-shaped composite channel. FIG. 36 shows an example of a cured composite structure 110 having an I-shaped cross section 130 formed by assembling a pair of C-shaped composite channels in back-to-back relation with each other. FIG. 37 shows an example of a cured composite structure 110 having a hat-shaped cross section 132 formed by assembling a primary laminate 134, wrap laminate 136, and a composite strip 222 collectively encapsulating a pair of continuous radius filler elements 330 each comprised of a plurality of end-to-end radius filler segments 300.

Advantageously, the use of radius filler segments 300 formed of thermoplastic material and fused together in end-to-end relationship in a cured composite structure 110 provides significant advantages with regard to manufacturing, structural performance, and cost. For example, a cured composite structure 110 having a continuous radius filler element 330 formed of thermoplastic material may be lighter in weight than a comparable cured composite structure in which the radius filler is formed of laminated carbon-epoxy composite plies. In addition, a plurality of radius filler segments 300 can be manufactured in relatively short lengths which may be more conducive to handling, storing, shipping, and assembling than a conventional radius filler formed of composite plies and extending the entire length of a cured composite structure. Furthermore, the thermoplastic material of the radius filler segments 300 may not require cold storage which is typically required for thermosetting prepreg composite plies as used for manufacturing conventional radius fillers. In this regard, the presently-disclosed radius filler segments 300 may be manufactured off-site in advance and stored until needed, and which may eliminate capital equipment costs associated with on-site manufacturing equipment for manufacturing conventional radius fillers formed of composite plies.

As mentioned above, the radius filler segments 300 may be manufactured by three-dimensional (3D) printing which advantageously allows for closely matching the shape requirements based on an engineering model (e.g., CAD model) of the radius cavity 204. As mentioned above, the relatively short length of the radius filler segments 300 is conducive to off-site manufacturing by a vendor. However, the ability to 3D print the radius filler segments 300 is conducive to on-site manufacturing. Advantageously, the cost of an on-site 3D printing machine is relatively low compared to the cost of specialized laminating machines required for laying up composite plies of a conventional radius filler. Furthermore, 3D printing machines may be used for on-site manufacturing of a variety of components, and are not limited to radius filler segments 300. Another advantage of 3D printing is that the thermoplastic material from which the radius filler segments 300 are fabricated may be selected to be compatible with a variety of prepreg material systems from which the composite base member 202 may be formed.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a cured composite structure, comprising:
   providing a plurality of radius filler segments, each having breakaway tabs interconnecting the radius filler segments, the breakaway tabs being located at spaced intervals along the length of adjacent pairs of radius filler segments, and extending between side edges of adjacent radius filler segments, and being separable from the radius filler segments;
   inserting the plurality of radius filler segments into a radius cavity extending along a length of an uncured composite base member to form an uncured structural assembly, the plurality of radius filler segments being in end-to-end arrangement within the radius cavity and each having opposing segment ends and being formed of a thermoplastic material;
   heating the structural assembly at least to a base member cure temperature that is at least as high as the temperature of the thermoplastic material at which the segment ends of end-to-end pairs of the plurality of radius filler segments fuse together and form a continuous radius filler element that extends along the length of the composite base member; and
   allowing the structural assembly to cure to form a cured composite structure.

2. The method of claim 1, wherein the step of heating the structural assembly at least to the base member cure temperature includes:
    heating the structural assembly to a temperature that causes the radius filler segments to adhere to the composite base member.

3. The method of claim 1, wherein:
    the radius filler segments each have a length of 3-15 feet; and
    the composite base member has a length of greater than 15 feet.

4. The method of claim 1, wherein the step of inserting the plurality of radius filler segments into the radius cavity includes:
    interlocking the segment ends of end-to-end pairs of the plurality of radius filler segments via interlocking features included on the segment ends of the radius filler segments.

5. The method of claim 1, further comprising:
    manufacturing at least one of the radius filler segments by one of three-dimensional printing, selective laser sintering, fused filament fabrication, die extrusion, or injection molding.

6. The method of claim 1, wherein inserting the plurality of radius filler segments into the radius cavity comprises:
    applying location markings on an composite panel indicating locations of the radius filler segments;
    placing the radius filler segments on the composite panel in alignment with the location markings to form at least one segment series of end-to-end radius filler segments;
    vacuum compacting the radius filler segments to the composite panel to at least partially bond the radius filler segments in position on the composite panel to form an panel subassembly; and
    assembling at least one composite base member to the panel subassembly such that the radius filler segments of the segment series are received into the radius cavity of the composite base member to form the structural assembly.

7. The method of claim 1, wherein the thermoplastic material of the radius filler segments is comprised of at least one of:
    acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material.

8. The method of claim 1, wherein:
    the thermoplastic material of the radius filler segments has a Young's modulus that is less than the Young's modulus of the composite base member.

9. The method of claim 1, wherein:
    the thermoplastic material of the radius filler segments has a percent elongation at failure that is greater than the percent elongation at failure of the composite base member.

10. The method of claim 1, wherein:
    the composite base member is comprised of reinforcing fibers embedded in a resin;
    the resin of the composite base member comprises one of thermosetting resin and thermoplastic resin;
        the thermoplastic resin comprises one of the following:
            acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material; acrylics, fluorocarbons, polyamides, polyolefins, polyesters, polycarbonates, polyurethanes, polyetherimides, polyethersulfone, polysulfone, and polyphenyl sulfone;
        the thermosetting resin comprises one of the following:
            polyurethanes, phenolics, polyimides, sulphonated polymer, a conductive polymer, benzoxazines, bismaleimides, cyanate esthers, polyesters, epoxies, and silsesquioxanes; and
    the reinforcing fibers of the composite base member are formed of at least one of plastic, glass, ceramic, carbon, metal or any combination thereof.

11. An uncured structural assembly, comprising:
    a composite base member having a base member cure temperature and a radius cavity extending along a length of the composite base member;
    a plurality of radius filler segments configured to be inserted into the radius cavity in end-to-end arrangement, the plurality of radius filler segments each having opposing segment ends and being homogenous and formed of a thermoplastic material, the plurality of radius filler segments each having breakaway tabs interconnecting the radius filler segments, the breakaway tabs being located at spaced intervals along the length of adjacent pairs of radius filler segments, and extending between side edges of adjacent radius filler segments, and being separable from the radius filler segments;
    the thermoplastic material having a temperature at which the segment ends of end-to-end pairs of the plurality of radius filler segments fuse together; and
    the base member cure temperature being at least as high as the temperature at which the segment ends of the radius filler segments fuse together.

12. The uncured structural assembly of claim 11, wherein:
    the segment ends each have interlocking features configured to interlock end-to-end pairs of the plurality of radius filler segments.

13. The uncured structural assembly of claim 11, wherein the thermoplastic material of the radius filler segments is comprised of at least one of:
    acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material.

14. The uncured structural assembly of claim 11, wherein:
    the base member is comprised of reinforcing fibers embedded in resin;
    the resin of the composite base member comprises one of thermosetting resin and thermoplastic resin;
        the thermoplastic resin comprises one of the following:
            acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material; acrylics, fluorocarbons, polyamides, polyolefins, polyesters, polycarbonates, polyurethanes, polyetherimides, polyethersulfone, polysulfone, and polyphenylsulfone; and
        the thermosetting resin comprises one of the following:

polyurethanes, phenolics, polyimides, sulphonated polymer, a conductive polymer, benzoxazines, bismaleimides, cyanate esthers, polyesters, epoxies, and silsesquioxanes; and the reinforcing fibers of the composite base member are formed of at least one of plastic, glass, ceramic, carbon, metal or any combination thereof.

15. The uncured structural assembly of claim 11, wherein:
the temperature at which the segment ends fuse together is the glass transition temperature of the thermoplastic material.

16. The uncured structural assembly of claim 11, wherein:
the radius filler segments each have a length of 3-15 feet; and the composite base member has a length of greater than 15 feet.

17. The uncured structural assembly of claim 11, wherein:
each breakaway tab has a notch extending across a width of the breakaway tab, and located proximate an intersection of the breakaway tab with one of the radius filler segments interconnected by the breakaway tab.

18. The uncured structural assembly of claim 11, wherein:
the thermoplastic material of the radius filler segments contains fibers.

19. The uncured structural assembly of claim 12, wherein the interlocking features comprise:
a tab on the segment end of at least one of the radius filler segments, and a recess on the segment end of another one of the radius filler segments, the tab is configured to nest within the recess.

20. The uncured structural assembly of claim 17, wherein:
the tab and the recess each have a dovetail configuration.

* * * * *